(12) United States Patent
Sharma

(10) Patent No.: US 11,785,510 B2
(45) Date of Patent: *Oct. 10, 2023

(54) COMMUNICATION SYSTEM

(71) Applicant: NEC Corporation, Tokyo (JP)

(72) Inventor: Vivek Sharma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,256

(22) Filed: Aug. 19, 2022

(65) Prior Publication Data

US 2022/0394567 A1    Dec. 8, 2022

Related U.S. Application Data

(63) Continuation of application No. 17/350,514, filed on Jun. 17, 2021, now Pat. No. 11,457,387, which is a
(Continued)

(30) Foreign Application Priority Data

Jan. 17, 2013    (GB) ..................................... 1300884

(51) Int. Cl.
*H04L 9/30*    (2006.01)
*H04W 36/00*    (2009.01)
(Continued)

(52) U.S. Cl.
CPC ....... *H04W 36/0038* (2013.01); *H04W 12/02* (2013.01); *H04W 12/033* (2021.01);
(Continued)

(58) Field of Classification Search
CPC ............. H04W 36/0038; H04W 12/02; H04W 12/033; H04W 12/037; H04W 12/04;
(Continued)

(56) References Cited

U.S. PATENT DOCUMENTS 11,457,387 B2 *   9/2022   Sharma ................. H04W 12/02
2005/0243803 A1   11/2005   Fang
(Continued)

FOREIGN PATENT DOCUMENTS

CN    102348244 A    2/2012
CN    102474717 A    5/2012
(Continued)

OTHER PUBLICATIONS

Japanese Office Action for JP Application No. 2020-104964 dated Mar. 8, 2022 with English Translation.
(Continued)

*Primary Examiner* — Tanmay K Shah

(57) ABSTRACT

A communication system is described in which user plane communication and control plane communication for a particular mobile communication device can be split between a base station that operates a small cell and a macro base station. Appropriate security for the user plane and control plane communications is safeguarded by ensuring that each base station is able to obtain or derive the correct security parameters for protecting the user plane or control plane communication for which it is responsible.

4 Claims, 13 Drawing Sheets

Related U.S. Application Data continuation of application No. 17/031,412, filed on Sep. 24, 2020, now Pat. No. 11,071,022, which is a continuation of application No. 16/852,135, filed on Apr. 17, 2020, now Pat. No. 10,820,240, which is a continuation of application No. 16/267,091, filed on Feb. 4, 2019, now Pat. No. 10,716,035, which is a continuation of application No. 15/851,597, filed on Dec. 21, 2017, now Pat. No. 10,237,787, which is a continuation of application No. 15/349,626, filed on Nov. 11, 2016, now Pat. No. 9,913,177, which is a continuation of application No. 14/761,363, filed as application No. PCT/JP2013/083535 on Dec. 10, 2013, now Pat. No. 9,526,002.

(51) Int. Cl.

| | | |
|---|---|---|
| H04W 12/04 | (2021.01) | |
| H04W 12/033 | (2021.01) | |
| H04W 12/037 | (2021.01) | |
| H04W 12/041 | (2021.01) | |
| H04W 12/0431 | (2021.01) | |
| H04W 12/0433 | (2021.01) | |
| H04W 12/02 | (2009.01) | |
| H04W 16/32 | (2009.01) | |
| H04W 84/04 | (2009.01) | |
| H04L 9/08 | (2006.01) | |

(52) U.S. Cl.
CPC ......... *H04W 12/037* (2021.01); *H04W 12/04* (2013.01); *H04W 12/041* (2021.01); *H04W 12/0431* (2021.01); *H04W 12/0433* (2021.01); *H04W 16/32* (2013.01); *H04L 9/0861* (2013.01); *H04L 2209/24* (2013.01); *H04W 36/0069* (2018.08); *H04W 84/045* (2013.01)

(58) Field of Classification Search
CPC ........... H04W 12/041; H04W 12/0431; H04W 12/0433; H04W 16/32; H04W 36/0069; H04W 84/045; H04L 9/0861; H04L 2209/24; H04L 5/0091
USPC ........................................................ 380/283
See application file for complete search history.

(56) References Cited

U.S. PATENT DOCUMENTS

| | | |
|---|---|---|
| 2009/0227234 A1 | 9/2009 | Bosch et al. |
| 2010/0202618 A1 | 8/2010 | Yang et al. |
| 2010/0316223 A1 | 12/2010 | Blom et al. |
| 2011/0261961 A1 | 10/2011 | Dharmaraju et al. |
| 2011/0274276 A1 | 11/2011 | Xu |
| 2012/0039472 A1 | 2/2012 | Liu et al. |
| 2013/0003967 A1 | 1/2013 | Norrman et al. |
| 2013/0165130 A1 | 6/2013 | Wu et al. |
| 2013/0195268 A1 | 8/2013 | Norrman et al. |
| 2014/0056243 A1 | 2/2014 | Pelletier et al. |
| 2014/0321371 A1 | 10/2014 | Anderson et al. |
| 2015/0126154 A1 | 5/2015 | Yang |
| 2015/0358813 A1 | 12/2015 | Lee et al. |

FOREIGN PATENT DOCUMENTS

| | | |
|---|---|---|
| CN | 102740289 | 10/2012 |
| CN | 102740289 A | 10/2012 |
| CN | 102761878 A | 10/2012 |
| CN | 102804825 A | 11/2012 |
| CN | 102823161 A | 12/2012 |
| EP | 2 456 244 A1 | 5/2012 |
| EP | 2 603 038 A1 | 6/2013 |
| EP | 2 863 666 | 4/2015 |
| EP | 3136763 A1 | 3/2017 |
| EP | 2648437 B1 | 6/2017 |
| EP | 3 364 679 A | 8/2018 |
| WO | WO 2011/038272 A1 | 3/2011 |
| WO | WO 2011/137775 A1 | 11/2011 |
| WO | 2012/060618 A3 | 5/2012 |
| WO | WO 2013/097672 A1 | 7/2013 |
| WO | WO 2014/109968 A1 | 7/2014 |
| WO | WO 2014/189632 A1 | 7/2014 |

OTHER PUBLICATIONS

CATT, Open issue related to Un reconfiguration, 3GPP TSG-RAN WG2 #89bis, R2-102026, Apr. 12-16, 2016.
CATT, Functionally of Un Reconfiguration, 3GPP TSG-RAN WG2 #70, R2-102787, May 10-14,2010.
CATT, Funtionality of Un RRC Connection Reconfiguration Procedure, 3GPP TSG-RAN WG2 #70bis, R2-103597, Jun. 26-Jul. 2, 2010.
Ericsson et al., "Security in dual connectivty", 3GPP TSG-RAN WG2 #82, Tdoc R2131671, pp. 1-3, May 2013.
Japanese Office Action dated Jun. 22, 2016, by the Japanese Patent Office in counterpart Japanese Patent Application No. 2015-534299.
3GPP TS 33.401 V12.6.0, $3^{rd}$ Generation Partnership Project; Technical Specification Group Services and System Aspects 3GPP System Architecture Evolution (SAE), Security architecture, (Release 12). pp. 1-121, Dec. 2012.
3GPP TS 33.220 V11.4.0, 3rd Generation Partnership Project; Technical Specification Group Services ar System Aspects. Generic Authentication Architecture (GAA), Generic Bootstrapping Architecture (GBA), (Release 11), pp. 1-92, Sep. 2012.
International Search Report dated Mar. 26, 2014 in corresponding PCT International Application.
Communication pursuant to Article 94(3) EPC issued by the European Patent Office in counterpart European Patent Application No. 13 812 187.6, dated Feb. 13, 2017.
Notification of First Office Action dated by Chinese Patent Office dated Dec. 14, 2017, in counterpart Chinese application No. 201360070857.4.
Office Action dated by Japanese Patent Office dated Jun. 8, 2018, in counterpart Japanese Application No. 2017-5670.
3GPP TS 33.401 V6.7.0 (Apr. 2010), 3rd Generation Partnership Project; Technical Specification Group Services and System Aspects. 3GPP System Architecture Evolution (SAE). Security architecture (Release 8).
Office Action dated by Japanese Patent Office dated Oct. 23, 2019, in counterpart Japanese Application No. 2019-076121.
Yuichi Kakishima et al. "System Throughput Evaluation on Phantom Cell Considering Transmission Bandwidth in the Downlink", Proceedings of the Institute of Electronics, Information and Communication Engineers Society Conference of IEICE 2012, Aug. 28, 2012.
Japanese Notice of Allowance dated Mar. 13, 2019, by the Japanese Patent Office in counterpart Japanese Patent Application No. 2017-063521.
3GPP TSG-RAN2#81 bis R2-131333 Security consideration for dual connectivity architecture, Apr. 15-19, 2013 Chicago, USA.
Notice of Allowance dated May 28, 2020 in co-pending U.S. Appl. No. 16/852,050 from the United States Patent and Trademark Office.
Office Action dated Nov. 3, 2020, issued by the Chinese Patent Office in counterpart Chinese Patent Application No. 2018110a4064. 8.
3GPP TR 33.821 V9.0.0. 3rd Generation Partnership Project, Technical Specification Group Services and System Aspects. Rationale and track of security decisions in Long Term Evolved (LTE) Ran/ 3GPP System.
3GPP TS 36.300 V11.4.0, 3rd Generation Partnership Project, Technical Specification Group Radio Access Network, Evolved Universal Terrestrial Radio Access (E-UTRA) and Evolved Universal Terrestrial Radio Access Network (E- UTRAN);Overall description; Stage 2(Release 11). Dec. 2012, pp. 1-207.

(56) References Cited

OTHER PUBLICATIONS

ZTE, "Discussion on PCC/SCC change", 3GPP TSG RAN WG2 #69bis R2-102174, Apr. 24-28, 2010, pp. 1-8, China.
Nokia Corporation et al., "Correction of AS key handling—Pseudo CR to TR 33.82", 3GPP TSG WG3 Security S3-090103, Jan. 19-23, 2009, pp. 1-14, Italy.
JP Office Communication for JP Application No. 2022-126727, dated Jul. 4, 2023 with English Translation.

* cited by examiner

COMMUNICATION SYSTEM

CROSS-REFERENCE TO RELATED APPLICATIONS

The present application is a continuation application of U.S. patent application Ser. No. 17/350,514 filed on Jun. 17, 2021, which is a continuation application of U.S. patent application Ser. No. 17/031,412 filed on Sep. 24, 2020, which is issued as U.S. Pat. No. 11,071,022, which is a continuation application of U.S. patent application Ser. No. 16/852,135 filed on Apr. 17, 2020, which is issued as U.S. Pat. No. 10,820,240, which is a continuation application of U.S. patent application Ser. No. 16/267,091 filed on Feb. 4, 2019, which is issued as U.S. Pat. No. 10,716,035, which is a continuation application of U.S. patent application Ser. No. 15/851,597 filed on Dec. 21, 2017, which is issued as U.S. Pat. No. 10,237,787, which is a continuation application of U.S. patent application Ser. No. 15/349,626 filed on Nov. 11, 2016, which is issued as U.S. Pat. No. 9,913,177, which is a continuation application of U.S. patent application Ser. No. 14/761,363 filed on Jul. 16, 2015, which is issued as U.S. Pat. No. 9,526,002, which is a National Stage Entry of International Application No. PCT/JP2013/083535 filed on Dec. 10, 2013, which claims the benefit of priority from United Kingdom Patent Application No. 1300884.2 filed on Jan. 17, 2013, the disclosures of all of which are incorporated in their entirety by reference herein.

TECHNICAL FIELD

The present invention relates to mobile communication devices and networks, particularly but not exclusively those operating according to the $3^{rd}$ Generation Partnership Project (3GPP) standards or equivalents or derivatives thereof. The invention has particular although not exclusive relevance to further development of the so called the Long Term Evolution (LTE)/advanced LTE (LTE-Advanced (LTE-A)) of UTRAN (called Evolved Universal Terrestrial Radio Access Network (E-UTRAN)).

BACKGROUND ART

It has been decided, as part of the 3GPP standardisation process, that downlink operation for system bandwidths beyond 20 MHz will be based on the aggregation of a plurality of component carriers at different frequencies. Such carrier aggregation can be used to support operation in a system both with and without a contiguous spectrum (for example, a non-contiguous system may comprise component carriers at 800 MHz, 2 GHz, and 3.5 GHz). Whilst a legacy mobile device may only be able to communicate using a single, backward compatible, component carrier, a more advanced multi-carrier capable terminal would be able to simultaneously use the multiple component carriers.

As mobile (cellular) communication technology has developed there have been proposals to provide enhanced communication in relatively small geographic regions by having small cells (e.g. 'pico' or 'femto' cells) that coexist with a larger ('macro') cell and provide enhanced communication capabilities in the localised geographic region that the small cell covers. These small cells can be provided on the same carrier as the macro cell or can be provided on a different (e.g. higher frequency) dedicated carrier.

More recently, it has been proposed to allow user data for a particular user device such as a mobile telephone or other mobile communication device (also referred to as 'user equipment' or a 'UE') to be communicated via a different cell to the cell via which control data for that user device is communicated. Specifically, it has been proposed to allow the user plane (U-plane) and control plane (C-plane) for a particular user device to be split between the small cell and the macro cell such that U-plane data is communicated via the small cell and C-plane data is communicated via the macro cell.

The small cell of this proposal is, effectively a 'pseudo' cell or 'phantom' cell because it does not provide conventional cell-specific signals and/or channels such as carrier reference signals, master information/system information broadcasts, primary/secondary synchronisation signals, etc.

In theory, the C-plane/U-plane split of this proposal provides an optimisation of: the benefits of the better connectivity typically offered by a macro cell for critical control signalling; and the benefits of higher throughput and more flexible, energy efficient, and cost effective communication offered by a small cell using a higher and/or wider frequency band for higher volume user data.

However, the C-plane/U-plane split proposal presents a number of challenges that need to be addressed if such a proposal is to be implemented practically in the global communication network.

One such challenge is the provision of appropriate communication security where different base stations are responsible for U-plane signalling and C-plane signalling respectively whilst ensuring that the user device is able to encipher/decipher user data and control data correctly. This has the potential to add significant unwanted complexity to signalling between the core network, the base station, and the user device.

Moreover, in order to ensure appropriate security it is beneficial to be able to, from time to time, regenerate the security keys used for encryption and integrity protection ('re-keying' or 'key-refresh'). Such dynamic key changing can be the result of explicit re-keying or implicit key-refresh procedures. To ensure that the security parameters used for ciphering and integrity protection remain unique, for example, key refresh is typically required when the Packet Data Convergence Protocol (PDCP) counter ('PDCP COUNT'), which is used as a ciphering input, reaches its limit and 'wraps around' or 'rolls over' back to its starting value. Re-keying/key-refresh avoids the risk that previously used PDCP COUNT values are re-used, in combination with the same security key, as inputs for ciphering thereby avoiding the cyclic re-use of earlier security parameters.

However, currently, such dynamic key refreshing is not possible when the U-plane and C-plane are split because the PDCP count is maintained in the U-plane whilst the control signalling required for re-keying occurs in the C-plane.

SUMMARY OF INVENTION

The invention therefore aims to provide a mobile communication system, a mobile communication device, a communication node and associated methods which overcomes or at least mitigates the above issues.

According to one aspect of the invention there is provided a mobile communication device for communicating user plane data via first communication apparatus, of a communication network, that operates a first communication cell, and for receiving control plane signalling related to user plane communication from second communication apparatus, of the communication network, that operates a second communication cell, said mobile communication device comprising: means for receiving security information;

means for obtaining, from said security information, at least one user plane security parameter for providing user plane security for said user plane communication via said first communication apparatus and at least one control plane security parameter for providing control plane security for control plane communication via said second communication apparatus; and means for applying said at least one user plane security parameter in said user plane communication via said first communication apparatus and for applying said at least one control plane security parameter in said control plane communication via said second communication apparatus.

Optionally, said mobile communication device may be operable to receive an indicator that user plane and control plane may be provided by different respective communication apparatus.

Optionally, said mobile communication device may be operable to receive said indicator that said user plane and said control plane may be provided by different respective communication apparatus from said second communication apparatus.

Optionally, said mobile communication device may be operable to receive said indicator that said user plane and said control plane may be provided by different respective communication apparatus from a communication entity of said communication network (e.g. a core network entity, e.g. a mobility management entity 'MME').

Optionally, said at least one user plane security parameter may comprise a security key '$K_{UPenc}$' for ciphering and/or deciphering user plane communication.

Optionally, said obtaining means may be operable to obtain said security key '$K_{UPenc}$' for ciphering and/or deciphering user plane communication from by deriving it using a further security key (e.g. '$K_{eNB}$' or '$K_{eNB}*$') obtained from said security information.

Optionally, said obtaining means may be operable to obtain said security key '$K_{UPenc}$,' for ciphering and/or deciphering without derivation requiring a further security key.

Optionally, said at least one user plane security parameter may comprise a security key '$K_{UPint}$' for integrity protection of user plane communication.

Optionally, said at least one control plane security parameter may comprise a security key '$K_{RRCnc}$' for ciphering and/or deciphering control plane communication.

Optionally, said at least one control plane security parameter may comprise a security key '$K_{RRCint}$' for integrity protection of control plane communication.

According to a further aspect of the invention there is provided a communication apparatus for operating a communication cell via which a mobile communication device that can engage in user plane communication, in a communication network in which further communication apparatus operates a further cell and provides control plane signalling related to said user plane communication, the communication apparatus comprising: means for operating said communication cell via which said mobile communication device can engage in user plane communication; means for receiving security information; means for obtaining, from said security information, at least one user plane security parameter for providing user plane security for said user plane communication; and means for applying said user plane security parameter to user plane communication via said first communication apparatus.

Optionally, said means for receiving said security information may be operable to receive said security information from said further communication apparatus.

Optionally, said means for receiving said security information may be operable to receive said security information over an X2 interface.

Optionally, said means for receiving said security information may be operable to receive said security information from a communication entity of said communication network (e.g. a core network entity, e.g. a mobility management entity 'MME').

Optionally, said means for receiving said security information may be operable to receive said security information over an S1 interface.

Optionally, said means for operating said communication cell may be configured to operate a cell that is small relative to the further cell operated by the further communication apparatus.

Optionally, said at least one user plane security parameter may comprise a security key '$K_{UPenc}$' for ciphering and/or deciphering user plane communication.

Optionally, said obtaining means may be operable to obtain said security key '$K_{UPenc}$,' for ciphering and/or deciphering user plane communication directly from said security information.

Optionally, said obtaining means may be operable to obtain said security key '$K_{UPenc}$' by deriving it using a further security key (e.g. '$K_{eNB}$' or '$K_{eNB}*$') obtained from said security information.

Optionally, the communication apparatus may further comprise means for transmitting an indicator to said further communication apparatus that said user plane security parameter for providing user plane security requires changing (e.g. in a re-keying or key refreshing procedure).

Optionally, said communication apparatus may comprise a base station.

Optionally, said base station may comprise an Evolved Universal Terrestrial Radio Access Network (E-UTRAN) base station.

According to a yet further aspect of the invention there is provided a communication apparatus for operating a communication cell via which control plane signalling is provided to a mobile communication device, in a communication network in which further communication apparatus operates a further cell via which said mobile communication device can engage in user plane communication to which said control plane signalling relates, the communication apparatus comprising: means for operating said communication cell via which said control plane signalling is provided to a mobile communication device; means for receiving security information from a communication entity of said communication network; means for obtaining, from said security information, at least one control plane security parameter for providing control plane security for said control plane signalling provided to said mobile communication device, and at least one further security parameter; means for providing security information comprising said further security parameter to said further communication apparatus; and means for applying said at least one control plane security parameter when providing said control plane signalling to said mobile communication device.

Optionally, said communication apparatus may be operable to transmit, to said mobile communication device, an indicator that user plane and control plane are provided by different respective communication apparatus.

Optionally, the communication apparatus may further comprise means for receiving an indicator from said further communication apparatus that a user plane security parameter for providing user plane security requires changing (e.g. in a re-keying or key refreshing procedure).

Optionally, the communication apparatus may further comprise means for initiating, in response to receiving said indicator that said user plane security parameter for providing user plane security requires changing, intra-cell handover whereby to provide a change in said user plane security parameter for providing user plane security.

Optionally, said communication apparatus comprises a base station.

Optionally, said base station comprises an Evolved Universal Terrestrial Radio Access Network (E-UTRAN) base station.

According to a yet further aspect of the invention there is provided a communication entity for a communication network in which a mobile communication device engages in user plane communication via first communication apparatus that operates a first communication cell, and in which the mobile communication device receives control plane signalling related to said user plane communication from second communication apparatus that operates a second communication cell, said communication entity comprising: means for receiving security information from a further communication entity of said communication network; means for obtaining, from said security information, at least one root security parameter which can be used in the derivation of: at least one user plane security parameter for providing user plane security for said user plane communication via said first communication apparatus; and at least one control plane security parameter for providing control plane security for control plane communication via said second communication apparatus; and means for providing security information comprising said root security parameter to said first communication apparatus in a first message and to said second communication apparatus in a second message.

Optionally, the communication entity may comprise a core network entity.

Optionally, the communication entity may comprise a mobility management entity (MME).

Optionally, said providing means may be operable to provide said first and said second messages over an S1 interface.

Optionally, said providing means may be operable to provide said first and said second messages using an S1 application protocol 'S1-AP'.

According to a yet further aspect of the invention there is provided a communication apparatus for operating a communication cell via which control plane signalling is provided to a mobile communication device, in a communication network in which further communication apparatus operates a further cell via which said mobile communication device can engage in user plane communication to which said control plane signalling relates, the communication apparatus comprising: means for operating said communication cell via which said control plane signalling is provided to a mobile communication device; means for receiving security information from a communication entity of said communication network; means for obtaining, from said security information, at least one control plane security parameter for providing control plane security for said control plane signalling provided to said mobile communication device; means for transmitting, to said mobile communication device, an indicator that user plane and control plane are provided by different respective communication apparatus; and means for applying said at least one control plane security parameter when providing said control plane signalling to said mobile communication device.

Optionally, said obtaining means may be operable to obtain, from said security information, at least one further security parameter; and may further comprise means for providing security information comprising said further security parameter to said further communication apparatus.

According to a yet further aspect of the invention there is provided a mobile communication device for communicating user plane data via first communication apparatus, of a communication network, that operates a first communication cell, and for receiving control plane signalling related to user plane communication from second communication apparatus, of the communication network, that operates a second communication cell, said mobile communication device comprising: means for obtaining a first set of security parameters for said user plane communication, from a first authenticated key agreement (AKA) procedure in respect of said first communication apparatus, and for generating an associated first security context; means for obtaining a second set of security parameters for control plane communication, from a second authenticated key agreement (AKA) procedure in respect of said second communication apparatus, and for generating an associated second security context; and means for maintaining said first security context and said second security context.

According to a yet further aspect of the invention there is provided a communication entity for a communication network in which a mobile communication device is able to engage in user plane communication via first communication apparatus that operates a first communication cell, and in which the mobile communication device is able to receive control plane signalling related to said user plane communication from second communication apparatus that operates a second communication cell, said communication entity comprising: means for performing a first authenticated key agreement (AKA) procedure, in respect of said first communication apparatus, for user plane communication and for generating an associated first security context; means for performing a second authenticated key agreement (AKA) procedure, in respect of said second communication apparatus, for control plane communication and for generating an associated second security context; and means for maintaining said first security context and said second security context.

According to a yet further aspect of the invention there is provided a method performed by a mobile communication device that is able to communicate user plane data via first communication apparatus, of a communication network, that operates a first communication cell, and is able to receive control plane signalling related to user plane communication from second communication apparatus, of the communication network, that operates a second communication cell, said method comprising: receiving security information; obtaining, from said security information, at least one user plane security parameter for providing user plane security for said user plane communication via said first communication apparatus and at least one control plane security parameter for providing control plane security for control plane communication via said second communication apparatus; and applying said at least one user plane security parameter in said user plane communication via said first communication apparatus and applying said at least one control plane security parameter in said control plane communication via said second communication apparatus.

According to a yet further aspect of the invention there is provided a method performed by communication apparatus when operating a cell via which a mobile communication device can engage in user plane communication, in a communication network in which further communication apparatus operates a further cell and provides control plane signalling related to said user plane communication, the method comprising: receiving security information; obtaining, from said security information, at least one user plane security parameter for providing user plane security for said user plane communication; and applying said user plane security parameter to said user plane communication via said first communication apparatus.

According to a yet further aspect of the invention there is provided a method performed by communication apparatus when operating a cell via which control plane signalling is provided to a mobile communication device, in a communication network in which further communication apparatus operates a further cell via which said mobile communication device can engage in user plane communication to which said control plane signalling relates, the method comprising: receiving security information from a communication entity of said communication network; obtaining, from said security information, at least one control plane security parameter for providing control plane security for said control plane signalling provided to said mobile communication device, and at least one further security parameter; providing security information comprising said further security parameter to said further communication apparatus; and applying said at least one control plane security parameter when providing said control plane signalling to said mobile communication device.

According to a yet further aspect of the invention there is provided a method performed by a communication entity in a communication network in which a mobile communication device engages in user plane communication via first communication apparatus that operates a first communication cell, and in which the mobile communication device receives control plane signalling related to said user plane communication from second communication apparatus that operates a second communication cell, said method comprising: receiving security information from a further communication entity of said communication network; obtaining, from said security information, at least one root security parameter which can be used in the derivation of: at least one user plane security parameter for providing user plane security for said user plane communication via said first communication apparatus; and at least one control plane security parameter for providing control plane security for control plane communication via said second communication apparatus; and providing security information comprising said root security parameter to said first communication apparatus in a first message and to said second communication apparatus in a second message.

According to a yet further aspect of the invention there is provided a method performed by communication apparatus when operating a communication cell via which control plane signalling is provided to a mobile communication device, in a communication network in which further communication apparatus operates a further cell via which said mobile communication device can engage in user plane communication to which said control plane signalling relates, the method comprising: operating said communication cell via which said control plane signalling is provided to a mobile communication device; receiving security information from a communication entity of said communication network; obtaining, from said security information, at least one control plane security parameter for providing control plane security for said control plane signalling provided to said mobile communication device; transmitting, to said mobile communication device, an indicator that user plane and control plane are provided by different respective communication apparatus; and applying said at least one control plane security parameter when providing said control plane signalling to said mobile communication device.

According to a yet further aspect of the invention there is provided a method performed by a mobile communication device that is able to communicate user plane data via first communication apparatus, of a communication network, that operates a first communication cell, and that is able to receive control plane signalling related to user plane communication from second communication apparatus, of the communication network, that operates a second communication cell, said method comprising: obtaining a first set of security parameters for said user plane communication, from a first authenticated key agreement (AKA) procedure in respect of said first communication apparatus, and generating an associated first security context; obtaining a second set of security parameters for control plane communication, from a second authenticated key agreement (AKA) procedure in respect of said second communication apparatus, and generating an associated second security context; and maintaining said first security context and said second security context.

According to a yet further aspect of the invention there is provided a method performed by a communication entity in a communication network in which a mobile communication device is able to engage in user plane communication via first communication apparatus that operates a first communication cell, and in which the mobile communication device is able to receive control plane signalling related to said user plane communication from second communication apparatus that operates a second communication cell, said method comprising: performing a first authenticated key agreement (AKA) procedure, in respect of said first communication apparatus, for said user plane communication and for generating an associated first security context; performing a second authenticated key agreement (AKA) procedure, in respect of said second communication apparatus, for control plane communication and for generating an associated second security context; and maintaining said first security context and said second security context.

According to a yet further aspect of the invention there is provided a communication system comprising a mobile communication device according to a previous aspect, first communication apparatus according to a previous aspect, and second communication apparatus according to a previous aspect, wherein said mobile communication device is configured for communicating user plane data via the first communication apparatus and for receiving control plane signalling related to said user plane communication from the second communication apparatus.

According to a yet further aspect of the invention there is provided a communication system comprising a mobile communication device according to a previous aspect, first communication apparatus according to a previous aspect, second communication apparatus, and a communication entity according to a previous aspect, wherein said mobile communication device is configured for communicating user plane data via the first communication apparatus and for receiving control plane signalling related to said user plane communication from the second communication apparatus.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described by way of example only with reference to the attached figures in which.

DESCRIPTION OF EMBODIMENTS

Overview

Figure 1:
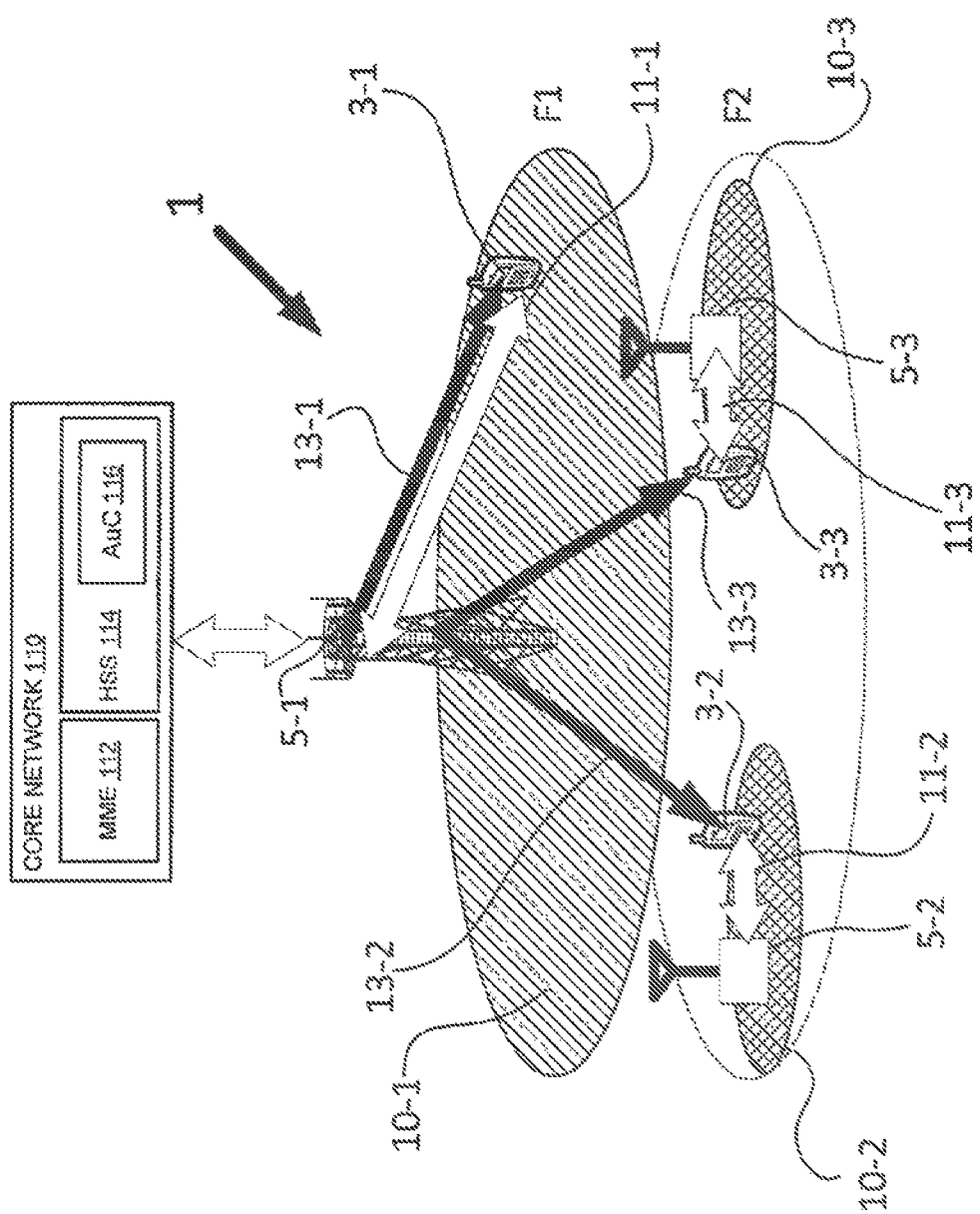
FIG. 1 schematically illustrates a telecommunication system.

FIG. 1 schematically illustrates a mobile (cellular) telecommunication system 1 in which a user of any of a plurality of mobile communication devices 3-1, 3-2, 3-3 can communicate with other users via one or more of a plurality of base stations 5-1, 5-2 and 5-3 and a core network 110. In the system illustrated in FIG. 1, each base station 5 shown is an Evolved Universal Terrestrial Radio Access Network (E-UTRAN) base station (or 'eNB') capable of operating in a multi-carrier environment.

The core network 110 comprises a plurality of functional/logical entities including a Mobility Management Entity (MME) 112, a Home Subscriber Server (HSS) 114, and an Authentication Centre (AuC) 116.

The MME 112 is a key control-node for the LTE access-network. It is responsible for, among other things, authenticating the user (by interacting with the HSS 114). Non Access Stratum (NAS) signalling terminates at the MME 112. The MME 112 is also the termination point in the network for ciphering/integrity protection for NAS signalling and handles the security key management.

The HSS 114 comprises a central database that contains user-related and subscription-related information. The functions of the HSS 114 include functionalities such as mobility management, call and session establishment support, user authentication and access authorization. The HSS 114, in this exemplary embodiment, includes the functionality of the AuC 116 (although this could be provided separately). The AuC 116 function provides authentication of each mobile communication device 3 (or more specifically the associated subscriber identity module (SIM) card) that attempts to connect to the core network 110 (e.g. when the mobile communication device 3 is powered on). Once the authentication is successful, the HSS 114 manages the SIM and services as described above. As described in more detail below, an encryption key is also generated by the AuC 116 function that is subsequently used to encrypt all wireless communications (voice, SMS, etc.) between the mobile communication devices 3 and the core network 110.

In FIG. 1, the base station labelled 5-1 comprises a so called 'macro' base station operating a relatively geographically large 'macro' cell 10-1 using an associated component carrier having a first frequency (F1). The other base stations 5-2, 5-3 shown in FIG. 1, each comprises a so called 'pico' base station operating a respective 'pico' cell 10-2, 10-3. Each pico cell 10-2, 10-3 is operated on a respective component carrier having a corresponding frequency band (F2). The power used to provide pico cells 10-2, 10-3 is low relative to the power used for the macro cell 10-1 and the pico cells 10-2, 10-3 are therefore small relative to the macro cell 10-1.

The macro base station 5-1 provides control signalling 13-1 in a control plane ('C-plane') to mobile communication devices, such as a mobile communication device 3-1, that are located in the macro cell 10-1 that it operates. The macro base station 5-1 also communicates user data 11-1 in a user plane ('U-plane') to and from mobile communication devices, such as a mobile communication device 3-1, that are located in the macro cell that it operates.

In the case of the pico cells 10-2, 10-3, however, the provision of the U-plane and the C-plane is split between the macro base station 5-1 and the pico base station 5-2 or 5-3 that operates the pico cell 10-2, 10-3. Specifically, the macro base station 5-1 provides control signalling 13-2, 13-3, in the control plane ('C-plane'), to mobile communication devices, such as a mobile communication device 3-2 and 3-3, that are located in the pico cells 10-2 and 10-3 that are operated by the pico base stations 5-2, 5-3. Contrastingly, each pico base station 5-2, 5-3 communicates user data 11-2, 11-3, in the U-plane, with a respective mobile communication device 3-2, 3-3, in the pico cell 10-2, 10-3, which that pico base station 5-2, 5-3 operates. The C-plane signalling includes, amongst other control signalling, signalling related to U-plane communication such, for example, signalling controlling resources used for user plane communication, signalling for controlling establishment and release of the user plane communication bearers, and signalling for controlling mobility (e.g. handover) of user plane communication between cells.

In more detail, the C-plane signalling comprises control signalling, including radio resource control (RRC) signalling, for: broadcast of System Information; paging; establishment, maintenance and release of an RRC connection between the mobile communication device 3 and the network; security functions including key management; establishment, configuration, maintenance and release of point to point radio bearers; mobility functions (hand over and cell reselection); quality of service (QoS) management functions; measurement reporting and control of the reporting; and resource allocation for the U-plane communication.

Security information required for enciphering/deciphering (encrypting/decrypting) C-plane data (and for integrity protection in the C-plane) for each pico cell 10-2, 10-3 is provided to the macro base station 5-1. The macro base station 5-1 uses the security information to derive appropriate security keys for enciphering/deciphering (encrypting/decrypting) the control signalling for each mobile communication device 3-2, 3-3 that is located in either of the pico cells 10-2, 10-3.

Security information required for enciphering/deciphering (encrypting/decrypting) the respective U-plane data (and for any integrity protection in the U-plane) for each pico cell 10-2, 10-3 is provided to the pico base station 5-2, 5-3 that operates that pico cell 10-2, 10-3. Each pico base station 5-2, 5-3 determines appropriate security keys for enciphering/deciphering (encrypting/decrypting) the user data for each mobile communication device 3-2, 3-3 that is located in the pico cell 10-2, 10-3 operated by that base station 5-2, 5-3.

Security information required for enciphering/deciphering (encrypting/decrypting)C-plane data and U-plane data (and any integrity protection) is also provided to each mobile communication device 3. Each mobile communication device 3 determines, from the security information, appropriate security keys for enciphering/deciphering (encrypting/decrypting) the user data and control data for that device.

Each mobile communication device 3-2, 3-3 communicating via a pico cell 10-2, 10-3 is also provided with an indication that the C-plane and U-plane are split between the macro and pico base stations. This beneficially helps to ensure that the mobile communication device 3-2, 3-3 can keep track of which base station 5 is responsible for the C-plane and which base station 5 is responsible for U-plane. Accordingly, the mobile communication device 3-2, 3-3 is able to derive the keys for enciphering/deciphering (encrypting/decrypting) the respective U-plane data (and for any integrity protection in the U-plane) correctly even though the base station handling U-plane communication is different to the base station providing C-plane communication.

Security Key Hierarchy and Key Derivation

Figure 2:
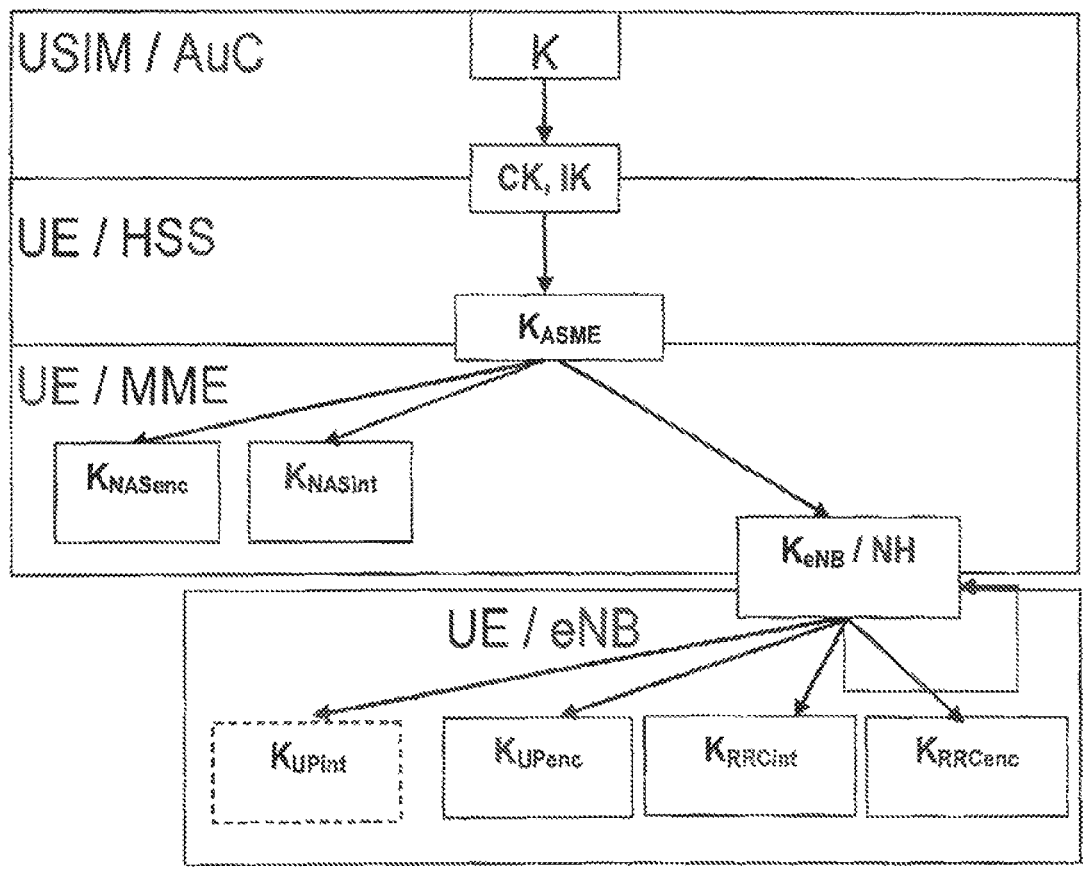
FIG. 2 illustrates a encryption/integrity key hierarchy used in the telecommunication system of FIG. 1.
Figure 3:
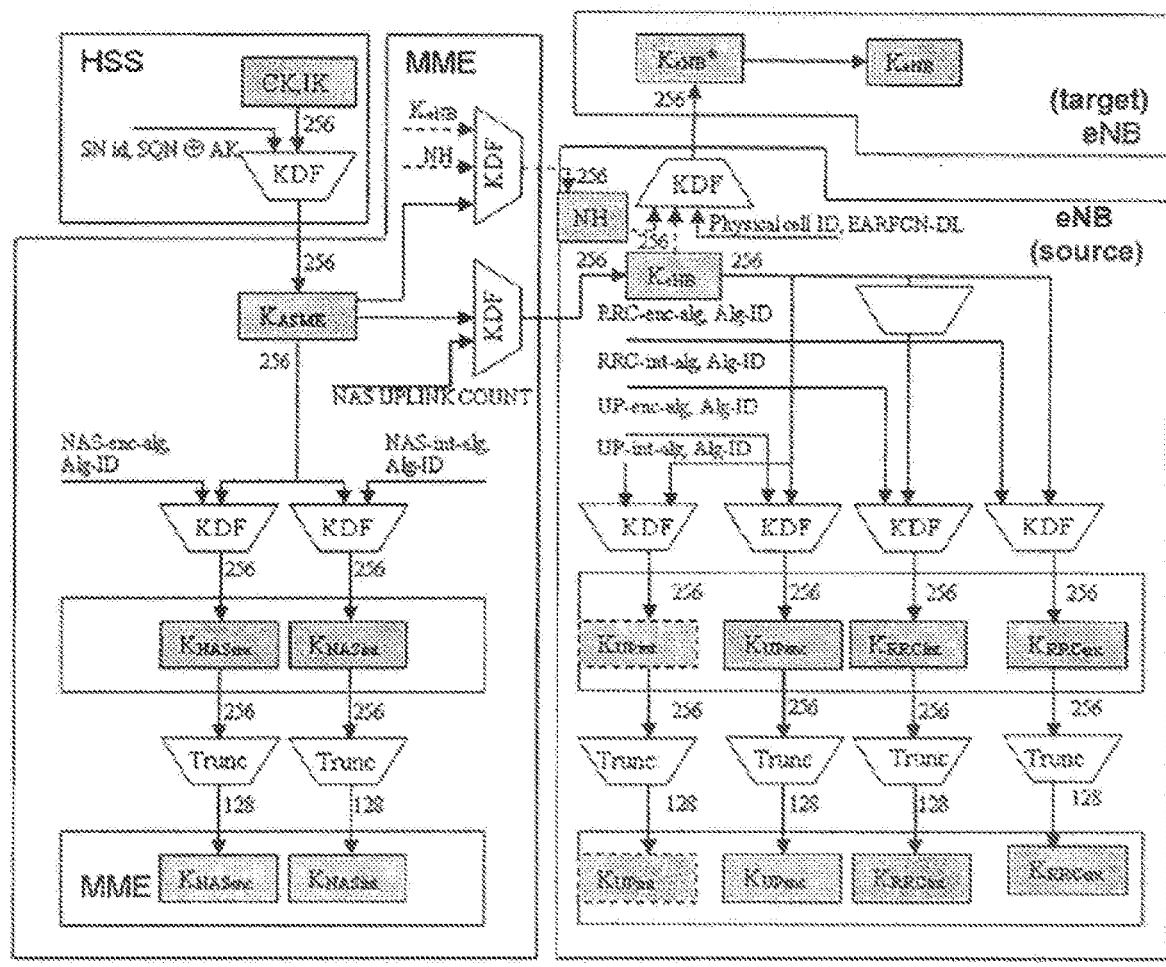
FIG. 3 illustrates a key derivation scheme used by a base station in the telecommunication system of FIG. 1.
Figure 4:
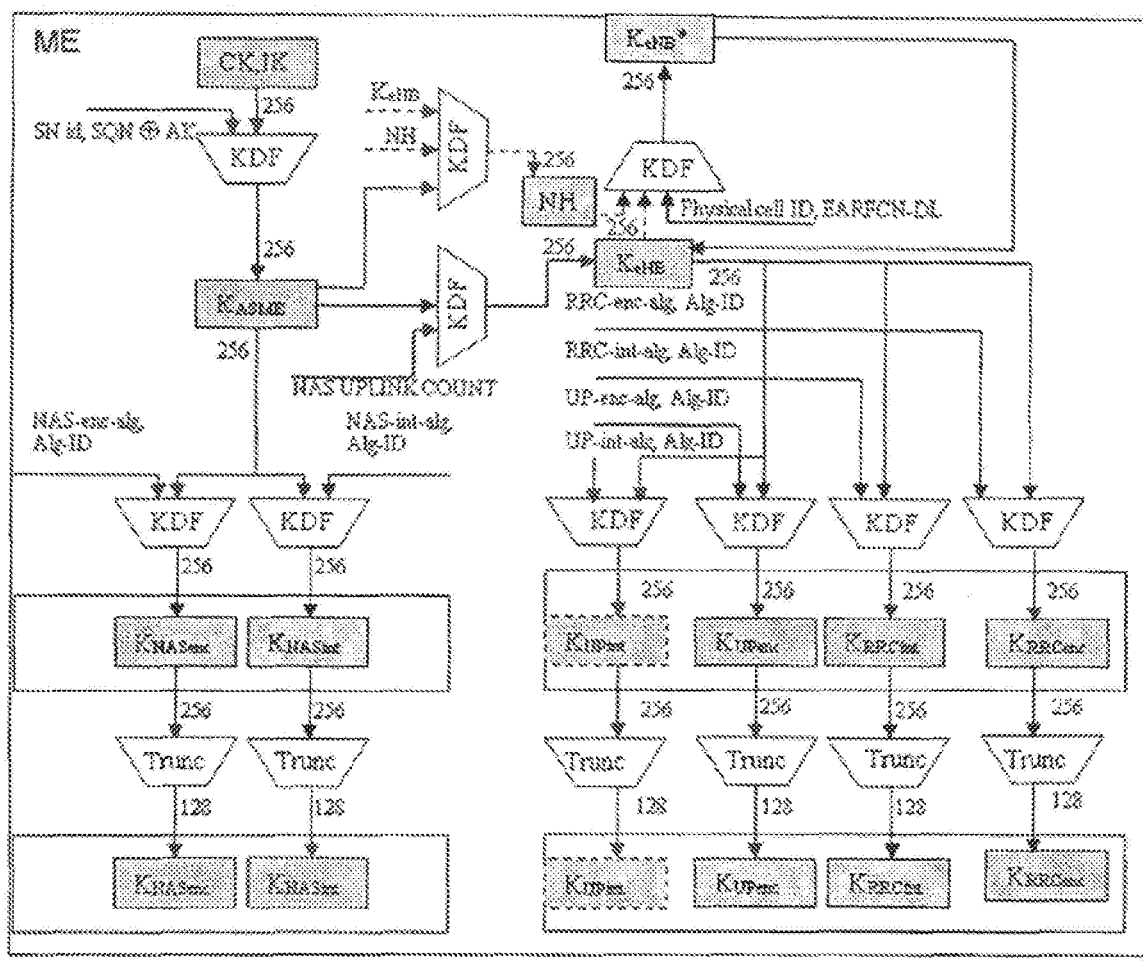
FIG. 4 illustrates a key derivation scheme used by a mobile communication device in the telecommunication system of FIG. 1.

FIGS. 2 to 4 illustrate a Security Key Hierarchy and Key Derivation in the mobile telecommunication system of FIG. 1.

Specifically, FIG. 2 illustrates a encryption/integrity key hierarchy used in the mobile telecommunication system of FIG. 1. FIG. 3 illustrates a key derivation scheme used by a base station in the telecommunication system of FIG. 1 and FIG. 4 illustrates a key derivation scheme used by a mobile communication device in the telecommunication system of FIG. 1.

FIGS. 2 to 4 are based on a similar figure from 3GPP Technical Standard (TS) 33.401 v 12.6.0 which, as a skilled person would understand, includes further detail of the security mechanisms that are employed in the mobile telecommunication system of FIG. 1.

Referring to FIGS. 2 to 4, the mobile telecommunication system 1 uses a number of security key parameters which, for the purposes of illustration, can be considered to be arranged in a hierarchy in which keys at a lower level in the hierarchy may be derived from keys higher up the hierarchy (possibly in combination with other parameters) using an appropriate key derivation function (KDF). In this exemplary embodiment, the KDF which is used to derive the security keys is the KDF described in 3GPP TS 33.220 v 11.4.0 (Annex B) with inputs as described in 3GPP TS 33.401 v 12.6.0 (Annex A).

As seen in FIGS. 2 to 4, the security information used in the mobile telecommunication system 1 includes the following security key parameters:

General Key Parameters:

K is a permanent key stored on a USIM or on a UICC in a mobile communication device 3 and in the AuC 116.

CK and IK ('cipher key' and 'integrity key' respectively) is a pair of keys derived in the AuC 116, and on the USIM/UICC, during an AKA procedure. CK, IK are handled differently depending on whether they are used in an Evolved Packet System security context or a legacy security context, as described in subclause 6.1.2 of 3GPP TS 33.401.

$K_{ASME}$ is an intermediate key that is derived in the HSS 114, and in the mobile communication device 3, from CK and IK (and the serving network identity (SN id)).

$K_{eNB}$ is a key derived by mobile communication device 3 and MME 112 from $K_{ASME}$ (or possibly by mobile communication device 3 and target eNB during handover).

Keys for NAS traffic:

$K_{NASint}$ is a key used for the protection of NAS traffic with a particular integrity algorithm. This key is derived by mobile communication device 3 and MME 112 from $K_{ASME}$, as well as an identifier for the integrity algorithm using a KDF with inputs as specified in clause A.7 of 3GPP TS 33.401.

$K_{NASenc}$ is a key used for the protection of NAS traffic with a particular encryption algorithm. This key is derived by mobile communication device 3 and MME 112 from $K_{ASME}$ and an identifier of the encryption algorithm, using a KDF with inputs as specified in clause A.7 of 3GPP TS 33.401.

Keys for User Plane traffic:

$K_{UPenc}$ is a key used for the protection of U-Plane traffic with a particular encryption algorithm. This key is derived by the mobile communication device 3 and macro base station 5-1 from $K_{eNB}$, as well as an identifier for the encryption algorithm using a KDF with inputs as specified in clause A.7 of 3GPP TS 33.401. In the case of U-plane/C-plane split between pico and macro base stations as described above, however, $K_{UPenc}$ is obtained at the pico base station 5-2, 5-3 (as described in more detail later) for use in the protection of U-Plane traffic with a particular encryption algorithm.

$K_{UPint}$ is a key used for the protection of U-Plane traffic between a Relay Node (RN) and Doner eNB (DeNB) with a particular integrity algorithm. This key is derived by the RN and the DeNB from $K_{eNB}$, as well as an identifier for the integrity algorithm using a KDF with inputs as specified in clause A.7 of 3GPP TS 33.401.

Keys for Control Plane (RRC) Traffic:

$K_{RRCint}$ is a key used for the protection of Radio Resource Control (RRC) traffic with a particular integrity algorithm. $K_{RRCint}$ is derived by the mobile communication device 3 and macro base station 5-1 from $K_{eNB}$, as well as an identifier for the integrity algorithm using a KDF with inputs as specified in clause A.7 of 3GPP TS 33.401.

$K_{RRCenc}$ is a key used for the protection of RRC traffic with a particular encryption algorithm. $K_{RRCenc}$ is derived by the mobile communication device 3 and macro base station 5-1 from $K_{eNB}$ as well as an identifier for the encryption algorithm using a KDF with inputs as specified in clause A.7 of 3GPP TS 33.401.

Intermediate Keys:

NH ('Next Hop') is a key derived by the mobile communication device 3 and MME 112, using a KDF with inputs as specified in clause A.4 of 3GPP TS 33.401, to provide forward security (e.g. during handover) as described in clause 7.2.8 of 3GPP TS 33.401.

$K_{eNB}^*$ is a key derived by mobile communication device 3, and a source base station, from NH or currently active $K_{eNB}$ for use in key derivation during handover/context modification using a KDF with inputs as specified in clause A.5 of 3GPP TS 33.401. Specifically, on handovers, $K_{eNB}^*$ is forwarded to a target base station from a source base station. The target base station uses the received $K_{eNB}^*$ directly as $K_{eNB}$ to be used with the mobile communication device 3 being handed over. In one example method, described in more detail later, this parameter is, advantageously, reused during C-plane/U-plane split.

A number of other notable parameters are also used in the security architecture of the mobile telecommunication network 1. These include:

AMF which is a so called Authenticated Management Field in a database at the AuC 116, and on the SIM card of the mobile communication device 3. The AMF is pre-shared between the mobile communication device 3 and the AuC 116 and is used in the calculation of certain security parameters (e.g. MAC and XMAC described below).

OP which is a so called Operator Variant Algorithm Configuration Field, in the database at the AuC 116, and on the SIM card of the mobile communication device 3.

SQN which is a sequence number which is incremented each time the network attempts to authenticate a mobile communication device 3.

RAND which is a random number for use in key generation and authentication.

AK which is a so called anonymity key generated at the AuC 116.

XRES which is a so-called 'expected response' generated at the AuC 116.

RES is a response parameter, equivalent to XRES, but generated at the mobile communication device 3 for sending to the MME 112 for comparison with XRES for authentication purposes.

MAC is a message authentication code generated at the AuC 116.

XMAC is the expected MAC value generated at the mobile communication device 3 for authenticating a message against a received MAC.

AUTN is a so called authentication token generated at the AuC 116.

When an MME 112 receives an attach request from a mobile communication device 3, the MME 112 sends the authentication data request to the AuC/HSS 116/114. After derivation of RAND, XRES, CK, IK, and AUTN the AuC 116 combines them into a so called authentication vector (AV=RAND∥XRES∥CK∥IK∥AUTN) which is sent to the MME 112. The MME 112 can then retrieve the individual parameters from the AV for sending to the mobile communication device during an authentication and key generation process as described in more detail below.

In order to cipher/decipher user plane data a ciphering function is used that has, as its inputs: $K_{UPenc}$; information identifying the radio bearer used for the communication ('BEARER'); a single bit indicator of the direction of the communication ('DIRECTION'); the length of the keystream required ('LENGTH') and a bearer specific, but time and direction dependent 32-bit value of an incremental counter ('COUNT') which corresponds to the 32-bit PDCP COUNT maintained in the PDCP layer for the mobile communication device 3 and the pico base station 5-2, 5-3.

Mobile Communication Device

Figure 5:
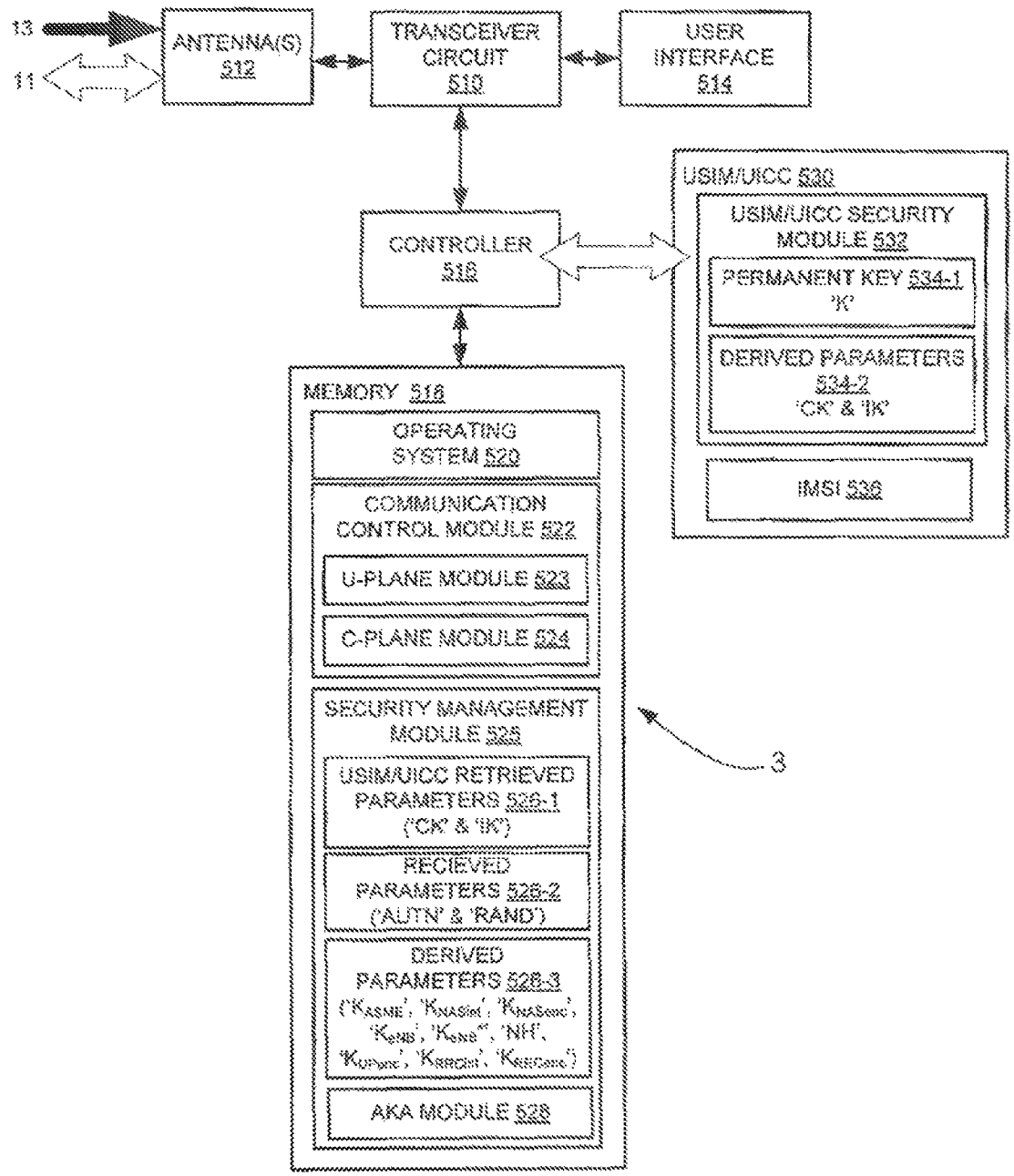
FIG. 5 shows a simplified block diagram of a mobile communication device for the telecommunication system of FIG. 1.

FIG. 5 is a block diagram illustrating the main components of the mobile communication devices 3 shown in FIG. 1. Each mobile communication device 3 comprises a mobile (or 'cell') telephone capable of operating in a multi-carrier environment. The mobile communication device 3 comprises a transceiver circuit 510 which is operable to transmit signals to, and to receive signals from, the base stations 5 via at least one antenna 512. The mobile communication device 3 comprises a user interface 514 via which a user can interact with the device (e.g. a touchscreen, keypad, microphone, speaker and/or the like).

The mobile communication device includes a subscriber identity module (SIM) 530 in the form of a Universal SIM (USIM) running on a Universal Integrated Circuit Card (UICC). The SIM 530 comprises a USIM/UICC security module 532 for obtaining and storing the permanent key 'K' 534-1 which, in operation, is used for generating the other security parameters used for communication security. The USIM/UICC security module 532 is also operable to derive other security parameters 534-2 such as the cipher key (CK) and integrity key (IK) using K and a 'random' value (e.g. a value of RAND provided by the AuC 116 via the MME 112). The SIM 530 has an identity 536 in the form of an international mobile subscriber identity (IMSI).

The operation of the transceiver circuit 510 is controlled by a controller 516 in accordance with software stored in memory 518.

The software includes, among other things, an operating system 520, a communication control module 522 and a security management module 525.

The communication control module 522 is configured for managing communication with the macro and/or base stations 5 on the associated component carriers. The communication control module 522 is configured for managing NAS communication with the MME 112 (indirectly via the base station). The communication control module 522 includes a U-plane module 523 for handling user data and a C-plane module 524 for handling control signalling such as radio resource control messages.

The security management module 525 is configured for managing communication security including the performance of authentication procedures, key and related security parameter generation and utilisation, and authentication and key agreement (AKA) to the extent that they are performed at the mobile communication device 3. The security management module 525 is able to handle retrieval/generation of appropriate parameters 526 for use in authentication/key generation procedures. These parameters include: UICC/USIM parameters 526-1 retrieved from the SIM 530 (e.g. parameters 534-2 such as CK and IK derived by the SIM 530); parameters 526-2 received from other sources (e.g. parameters such as AUTN and RAND received from the MME 112 in Non-Access Stratum (NAS) signalling); and parameters 526-3 that may be derived at the mobile communication device (e.g. $K_{ASME}$, $K_{NASint}$, $K_{NASenc}$, $K_{eNB}$, $K_{eNB}^*$, NH, $K_{UPenc}$, $K_{RRCint}$, $K_{RRCenc}$, etc.). The security management module 525 also includes an AKA module 528 for managing AKA procedures to the extent performed by the mobile communication device 3.

Macro Base Station

Figure 6:
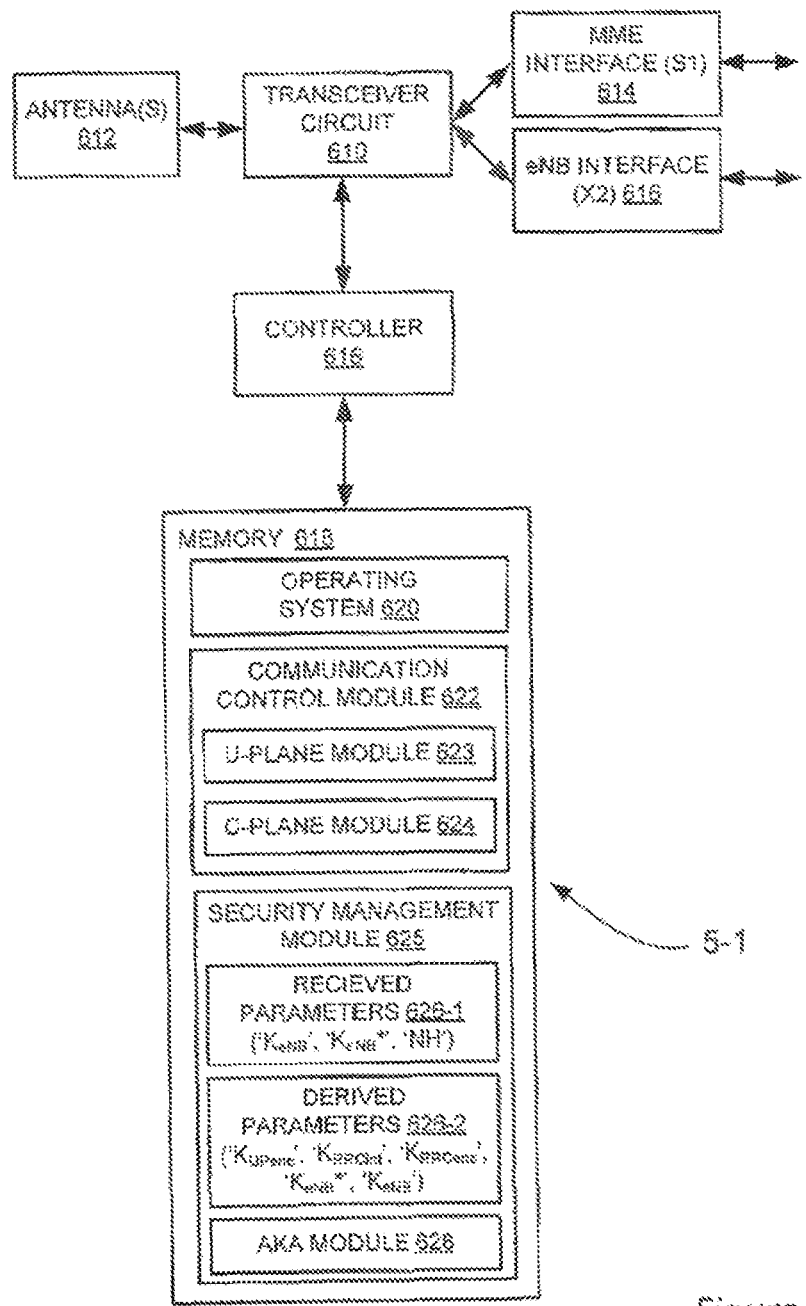
FIG. 6 shows a simplified block diagram of a 'macro' base station for the telecommunication system of FIG. 1.

FIG. 6 is a block diagram illustrating the main components of the macro base station 5-1 shown in FIG. 1. The macro base station 5-1 comprises an E-UTRAN multicarrier capable base station comprising a transceiver circuit 610 which is operable to transmit signals to, and to receive signals from, the mobile communication devices 3 via at least one antenna 612. The base station 5-1 is also operable to transmit signals to and to receive signals from: the MME 112 of the core network 110 via an MME (S1) interface 614; and other base stations 5 via an eNB (X2) interface 616.

The operation of the transceiver circuit 610 is controlled by a controller 616 in accordance with software stored in memory 618.

The software includes, among other things, an operating system 620, a communication control module 622 and a security management module 625.

The communication control module 622 is configured for managing communication between the macro base station 5-1 and the mobile communication devices 3 operating within the geographic area covered by the macro cell 10-1. The communication control module 622 is also configured to manage S1-AP signalling between the macro base station 5-1 and the MME 112 and X2-AP signalling between macro base station 5-1 and other base stations.

The communication control module 622 includes a U-plane module 623 for handling user data for the mobile communication device 3-1 communicating via the macro cell 10-1. The communication control module 622 also includes a C-plane module 624 for generating control signalling, such as radio resource control (RRC) messages, for transmission to the mobile communication device 3-1 communicating via the macro cell 10-1 and for the mobile communication devices 3-2 and 3-3 that communicate user data via respective pico cells 10-2, 10-3.

The security management module 625 is configured for managing communication security including the performance of authentication procedures, key and related security parameter generation and utilisation, and authentication and key agreement (AKA) procedures to the extent that they are performed at the macro base station 5-1.

The security management module 625 is able to handle receipt/generation of appropriate parameters 626 for use in authentication/key generation procedures. These parameters 626 include parameters 626-1 received from other sources (e.g. $K_{eNB}$ or NH received from the MME 112, or $K_{eNB}^*$ received from a source base station during handover). The parameters 626 also include parameters 626-2 that may be derived at the macro base station 5-1 during normal operation (e.g. $K_{UPenc}$, $K_{RRCint}$, $K_{RRCenc}$) or during handover (e.g. $K_{eNB}^*$ when operating as a source node or $K_{eNB}=K_{eNB}^*$) when operating as a target node etc.). The security management module 625 also includes an AKA module 628 for managing AKA procedures to the extent performed by the macro base station 5-1.

Pico Base Station

Figure 7:
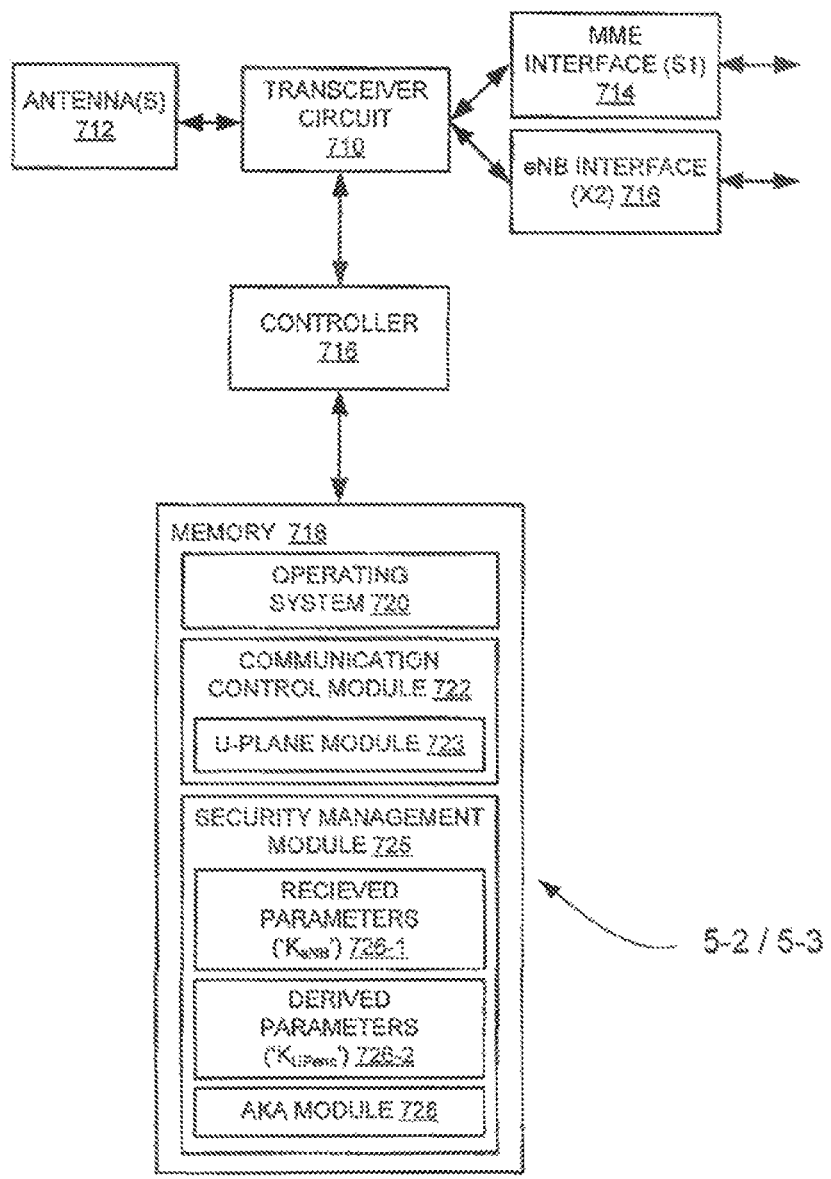
FIG. 7 shows a simplified block diagram of a 'pico' base station for the telecommunication system of FIG. 1.

FIG. 7 is a block diagram illustrating the main components of a pico base station 5-2, 5-3 shown in FIG. 1. The pico base station 5-2, 5-3 comprises an E-UTRAN multicarrier capable base station comprising a transceiver circuit 710 which is operable to transmit signals to, and to receive signals from, the mobile communication devices 3 via at least one antenna 712. The pico base station 5-2, 5-3 is also operable to transmit signals to and to receive signals from: the MME 112 of the core network 110 via an MME (S1) interface 714; and other base stations via an eNB (X2) interface 716.

The operation of the transceiver circuit 710 is controlled by a controller 716 in accordance with software stored in memory 718.

The software includes, among other things, an operating system 720, a communication control module 722 and a security management module 725.

The communication control module 722 is configured for managing communication between the pico base station 5-2, 5-3 and the mobile communication devices 3-2, 3-3 communicating via the pico cell 10-2, 10-3. The communication control module 722 is also configured for managing S1-AP signalling between the pico base station 5-2, 5-3 and the MME 112 and X2-AP signalling between pico base station 5-2, 5-3 and other base stations.

The communication control module 722 includes a U-plane module 723 for handling user data for a mobile communication device 3-2, 3-3 communicating via the pico cell 10-2, 10-3.

The security management module 725 is configured for managing communication security including the performance of authentication procedures, key and related security parameter generation and utilisation, and authentication and key agreement (AKA) procedures to the extent that they are performed at the pico base station 5-2, 5-3.

The security management module 725 is able to handle receipt/generation of appropriate parameters 726 for use in authentication/key generation procedures. These parameters 726 include parameters 726-1 received from other sources (e.g. $K_{eNB}$ in this embodiment). The parameters 726 also include parameters 726-2 that may be derived at the pico base station 5-2, 5-3 (e.g. $K_{UPenc}$). The security management module 725 also includes an AKA module 728 for managing AKA procedures to the extent performed by the pico base station 5-2, 5-3.

MME

Figure 8:
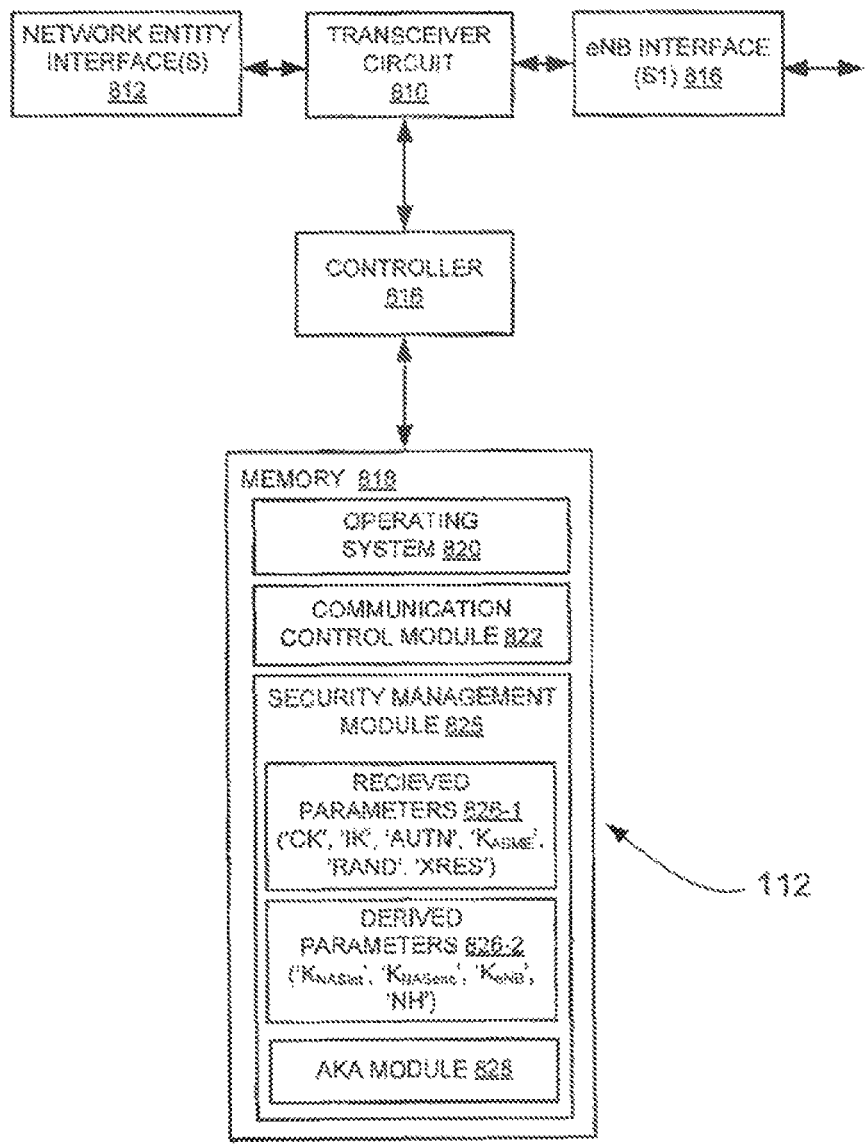
FIG. 8 shows a simplified block diagram of a mobility management entity for the telecommunication system of FIG. 1.

FIG. 8 is a block diagram illustrating the main components of the mobility management entity (MME) 112 shown in FIG. 1. The MME 112 comprises a transceiver circuit 810 which is operable to transmit signals to, and to receive signals from other network devices (such as the HSS) via an associated network entity interface 812. The transceiver circuit 810 is also operable to transmit signals to, and to receive signals from, a base station 5 via an eNB (S1) interface 816 including S1-AP signalling for the base station 5, and NAS signalling, which is transparent to the base station, for the mobile communication device 3.

The operation of the transceiver circuit 810 is controlled by a controller 816 in accordance with software stored in memory 818.

The software includes, among other things, an operating system 820, a communication control module 822 and a security management module 825.

The communication control module 822 is configured for managing NAS signalling between the MME 112 and the mobile communication devices 3 and S1-AP signalling between the MME 112 and the base station 5.

The security management module 825 is configured for managing communication security including the performance of authentication procedures, key and related security parameter generation and utilisation, and authentication and key agreement (AKA) procedures to the extent that they are performed at the MME 112.

The security management module 825 is able to handle receipt/generation of appropriate parameters 826 for use in authentication/key generation procedures. These parameters 826 include parameters 826-1 received from other sources (e.g. CK, IK, AUTN, $K_{ASME}$, RAND, XRES retrieved from an AV received from the HSS/AuC 114/116 etc.). The parameters 826 also include parameters 826-2 that may be derived at the MME 112 (e.g. $K_{NASint}$, $K_{NASenc}$, $K_{eNB}$, NH etc.). The security management module 825 also includes an AKA module 828 for managing AKA procedures to the extent performed by the MME 112.

Operation Overview—Security Parameter Provision

FIGS. 9 to 13 show simplified timing diagrams each illustrating operation of the telecommunication system of FIG. 1 in the performance of a respective variation of a security procedure. As those skilled in the art will appreciate, the timing diagrams only show signalling that is particularly relevant to the security. Other signalling will generally occur but has, for reasons of clarity, been omitted from the simplified timing diagrams.

As seen in FIGS. 9 to 13, each security procedure illustrated uses a different respective mechanism for ensuring that appropriate security parameters (in particular appropriate values of $K_{UPenc}$) are consistently used for U-plane protection both at the mobile communication device 3 and at the base station.

Whilst the different security procedures illustrated in FIGS. 9 to 13 are shown separately, it will be appreciated that key features of the security procedures may be combined, where appropriate, or provided as alternative implementation options in a deployed system.

MME Based $K_{eNB}$ Provision

Figure 9:
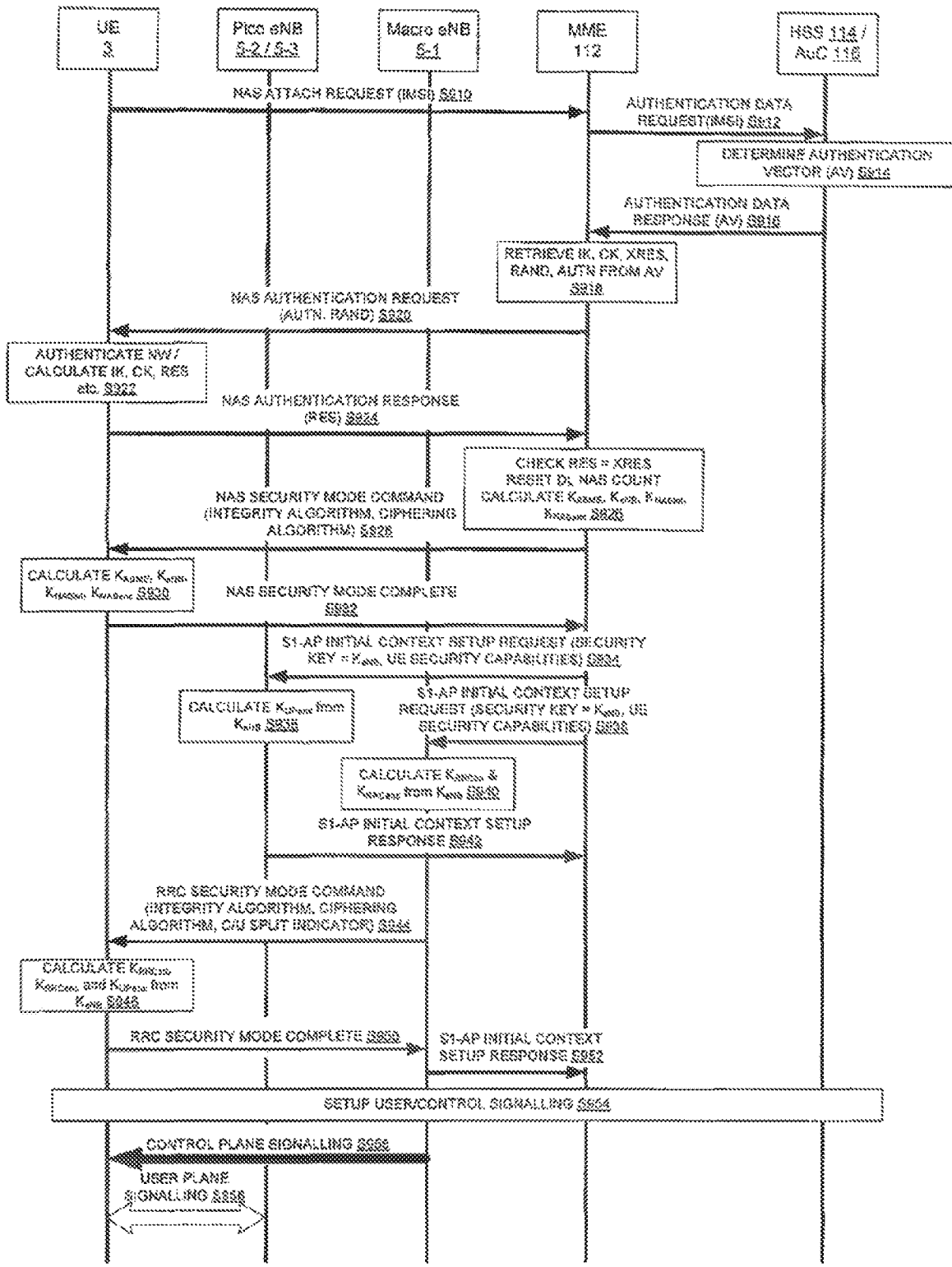
FIG. 9 shows a simplified timing diagram illustrating operation of the telecommunication system of FIG. 1 in the performance of a first security procedure.

FIG. 9 shows a simplified timing diagram illustrating operation of the telecommunication system of FIG. 1 in the performance of a first security procedure in which appropriate security parameters, and in particular appropriate values of $K_{UPenc}$, are generated at the pico base station 5-2, 5-3 in response to signalling from the MME 112.

At the start of the security procedure illustrated, a mobile communication device 3 wishing to initiate communication in the pico cell 5-1, 5-2 sends a non access stratum (NAS) message requesting attachment (e.g. an 'NAS ATTACH REQUEST' message) to the MME 112 (transparently via the macro base stations 5-1) at S910 including information identifying the SIM card 530 of the mobile communication device 3 (e.g. the 'international mobile subscriber identity (IMSI)').

The MME 112 responds to this request, at S912, by sending a message requesting authentication and including information identifying the SIM card 530 to the HSS 114 (e.g. and 'AUTHENTICATION DATA REQUEST' message). The AuC function 116 of the HSS 114 derives RAND, XRES, CK, IK, AUTN and combines them to form an authentication vector for the SIM card 530 (AV=RAND∥XRES∥CK∥IK∥AUTN) at S914 and sends the generated AV to the MME 112 at S916 (e.g. in a 'AUTHENTICATION DATA RESPONSE' message).

The MME 112 retrieves IK, CK, XRES, RAND and AUTN from the AV at S918 and sends the AUTN and RAND parameters to the mobile communication device 3 using NAS signalling at S920 (e.g. in an 'NAS AUTHENTICATION REQUEST' message).

The mobile communication device 3 responds, at S922, by authenticating the network using the received AUTN, and by deriving appropriate security related parameters (IK, CK, RES etc.) using the stored permanent security key 'K' and the received AUTN and RAND parameters (and any other parameters where necessary—e.g. AMF for the determination of XMAC). Assuming the authentication is successful, the mobile communication device 3 sends the calculated value of RES to the MME 112 at S924 (e.g. in an 'NAS AUTHENTICATION RESPONSE' message).

The MME 112 checks the received RES value against XRES at S926, resets the downlink NAS count, and derives values of $K_{ASME}$, $K_{eNB}$, $K_{NASint}$ and $K_{NASenc}$. The MME 112 then initiates NAS signalling security between the MME 112 and the mobile communication device 3, at S928, by sending an NAS SECURITY MODE COMMAND message informing the mobile communication device 3 of the respective algorithms to use for integrity protection and (de)ciphering.

The mobile communication device 3 responds, at S930, by deriving values of $K_{ASME}$, $K_{eNB}$, $K_{NASint}$ and $K_{NASenc}$ and then, at S932, by sending a response message informing the MME 112 that NAS signalling security initialisation is complete.

The method then proceeds by initiating security context setup at both the pico base station 5-2, 5-3, and at the macro base station 5-1, by sending substantially duplicate S1 application (S1-AP) messages (e.g. 'S1-AP INITIAL CONTEXT SETUP REQUEST' messages) to the pico base station 5-2, 5-3 at S934, and to the macro base station 5-1 at S936. The S1-AP messages each include the derived value of $K_{eNB}$ and details of the security capabilities for the mobile communication device 3.

The pico base station 5-2, 5-3 then derives, at S938, the security parameter(s) required for U-plane enciphering/deciphering (e.g. $K_{UPenc}$) from the received $K_{eNB}$. Similarly, the macro base station 5-1 derives, at S940, the security parameter(s) required for C-plane enciphering/deciphering (e.g. $K_{RRCint}$ and $K_{RRCenc}$) from the received $K_{eNB}$.

At S942, assuming security context setup at the pico base station 5-2, 5-3 is successful, the pico base station 5-2, 5-3 confirms this to the MME 112 in an appropriate S1-AP message (e.g. an 'S1-AP INITIAL CONTEXT SETUP RESPONSE' message).

The macro base station 5-1 then initiates, at S944, an RRC (and user plane) security context setup at the mobile communication device 3 using RRC signalling (e.g. an 'RRC SECURITY MODE COMMAND' message) which includes information identifying the algorithms used for integrity protection and/or ciphering and an information indicating that the U-plane and C-plane are split (e.g. in the form of a dedicated information element (IE), a modified IE, or re-use of an existing IE).

The mobile communication device 3 responds, at S946, by initialising the RRC security context for communication with the macro base station 5-1 by deriving the values of $K_{RRCint}$, $K_{RRCenc}$ from the previously calculated value of $K_{eNB}$ for use with control signalling from the macro base station 5-1. The mobile communication device 3 also initialises the U-plane security context for communication with the pico base station 5-2, 5-3 by deriving the value of $K_{UPenc}$ from $K_{eNB}$ for use with user plane signalling to/from the pico base station 5-2, 5-3.

Assuming the security context setup is successful the mobile communication device 3 confirms this, at S932, by sending an appropriate response message to the macro base station 5-1 (e.g. an 'RRC SECURITY MODE COMPLETE' message) at S950.

The macro base station 5-1 confirms, at S952, successful security context setup to the MME 112 in an appropriate S1-AP message (e.g. an 'S1-AP INITIAL CONTEXT SETUP REQUEST' message).

Once the various security contexts (NAS and AS) have been initialised successfully on the various devices, the control and user signalling connections can be setup at S954 and the mobile communication device 3 can commence communication in which control plane signalling (S956) is provided by the macro base station 5-1 and U-plane signalling is provided via the pico base station 5-2, 5-3 (S958).

Advantageously, therefore, this method provides an efficient way of providing appropriate communication security where different base stations are responsible for U-plane signalling and C-plane signalling respectively. The user device is able to maintain an appropriate security context for both the U-Plane and the C-plane thereby allowing it to encipher/decipher user data and control data correctly and to keep track of the security parameters (keys) used in the different base stations.

This approach has the benefit over the other methods described herein that it avoids the need for the modification of base station to base station signalling (over the X2 or possibly a new interface) and the associated increase X2-AP the complexity. However, other methods described herein have the benefit that S1 signalling duplication is avoided and hence S1 signalling overhead is reduced.

Base Station Based $K_{eNB}$ Provision

Figure 10:
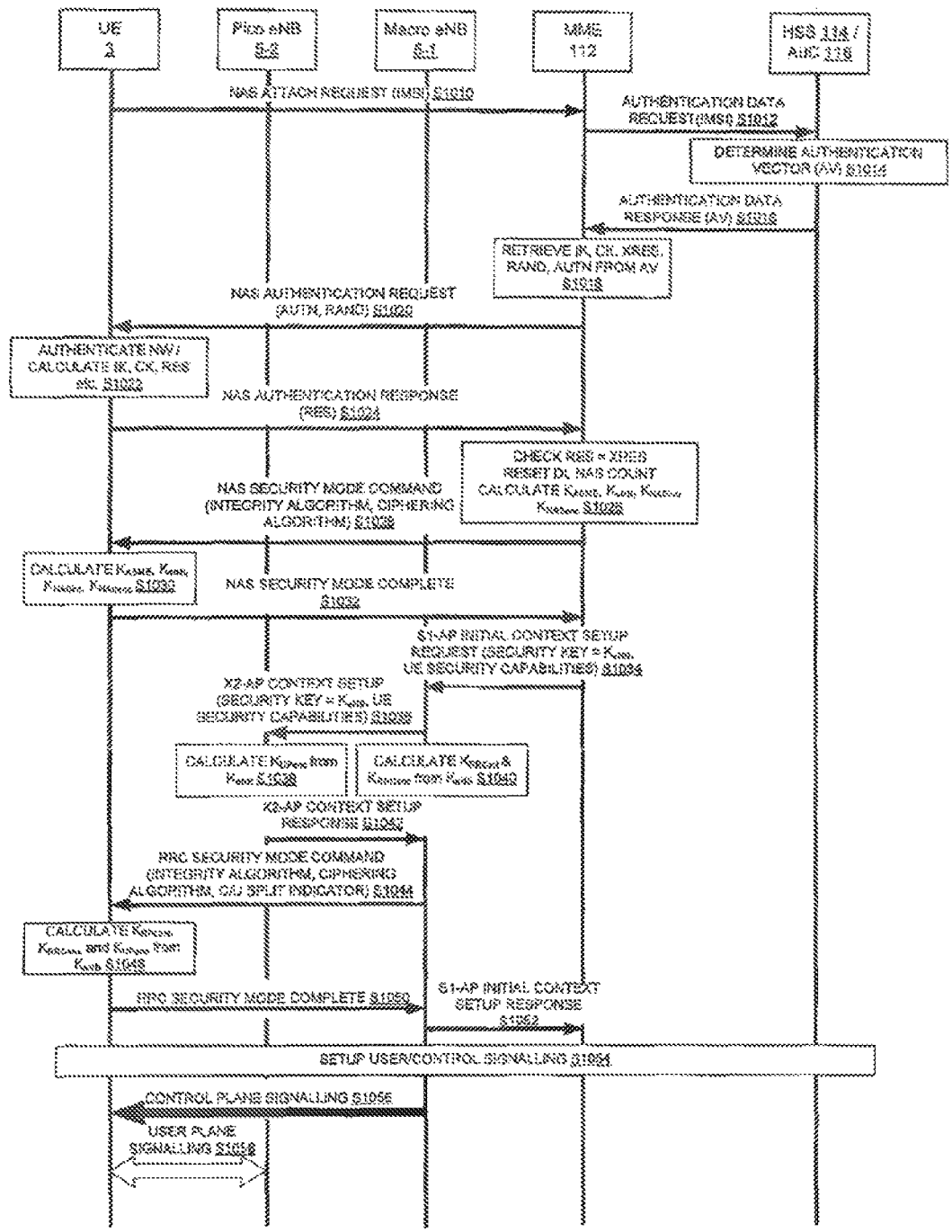
FIG. 10 shows a simplified timing diagram illustrating operation of the telecommunication system of FIG. 1 in the performance of a second security procedure.

FIG. 10 shows a simplified timing diagram illustrating operation of the telecommunication system of FIG. 1 in the performance of a second security procedure in which appropriate security parameters, and in particular appropriate values of $K_{UPenc}$, are generated at the pico base station 5-2, 5-3 in response to signalling from the macro base station 5-1.

At the start of the security procedure illustrated in FIG. 10, a mobile communication device 3 wishing to initiate communication in the pico cell 5-1, 5-2 sends a non access stratum (NAS) message requesting attachment (e.g. an 'NAS ATTACH REQUEST' message) to the MME 112 (transparently via the macro base stations 5-1) at S1010 including information identifying the SIM card 530 of the mobile communication device 3 (e.g. the 'international mobile subscriber identity (IMSI)').

The MME 112 responds to this request, at S1012, by sending a message requesting authentication and including information identifying the SIM card 530 to the HSS 114 (e.g. and 'AUTHENTICATION DATA REQUEST' message). The AuC function 116 of the HSS 114 derives RAND, XRES, CK, IK, AUTN and combines them to form an authentication vector for the SIM card 530 (AV=RAND||XRES||CK||IK||AUTN) at S1014 and sends the generated AV to the MME 112 at 51016 (e.g. in a 'AUTHENTICATION DATA RESPONSE' message).

The MME 112 retrieves IK, CK, XRES, RAND and AUTN from the AV at 51018 and sends the AUTN and RAND parameters to the mobile communication device 3 using NAS signalling at 51020 (e.g. in an 'NAS AUTHENTICATION REQUEST' message).

The mobile communication device 3 responds, at S1022, by authenticating the network using the received AUTN, and by deriving appropriate security related parameters (IK, CK, RES etc.) using the stored permanent security key 'K' and the received AUTN and RAND parameters (and any other parameters where necessary—e.g. AMF for the determination of XMAC). Assuming the authentication is successful, the mobile communication device 3 sends the calculated value of RES to the MME 112 at 51024 (e.g. in an 'NAS AUTHENTICATION RESPONSE' message).

The MME 112 checks the received RES value against XRES at 51026, resets the downlink NAS count, and derives values of $K_{ASME}$, $K_{eNB}$, $K_{NASint}$ and $K_{NASenc}$. The MME 112 then initiates NAS signalling security between the MME 112 and the mobile communication device 3, at S1028, by sending an NAS SECURITY MODE COMMAND message informing the mobile communication device 3 of the respective algorithms to use for integrity protection and (de) ciphering.

The mobile communication device 3 responds, at S1030, by deriving values of $K_{ASME}$, $K_{eNB}$, $K_{NASint}$ and $K_{NASenc}$ and then, at 51032, by sending a response message informing the MME 112 that NAS signalling security initialisation is complete.

The method then proceeds by initiating security context setup at the macro base station 5-1, by sending an S1 application (S1-AP) message (e.g. an 'S1-AP INITIAL CONTEXT SETUP REQUEST' message) to the macro base station 5-1 at 51034. The S1-AP message includes the derived value of $K_{eNB}$ and details of the security capabilities for the mobile communication device 3.

The macro base station 5-1 initiates security context setup at the pico base station 5-2, 5-3, by sending an X2 application (X2-AP) message (e.g. a new 'X2-AP CONTEXT SETUP' message) to the pico base station 5-2, 5-3 at 51036. The X2-AP message includes the derived value of $K_{eNB}$ and details of the security capabilities for the mobile communication device 3.

The pico base station 5-2, 5-3 then derives, at 51038, the security parameter(s) required for U-plane enciphering/deciphering (e.g. $K_{UPenc}$) from the received $K_{eNB}$ received from the macro base station 5-1. Similarly, the macro base station 5-1 derives, at 51040, the security parameter(s) required for C-plane enciphering/deciphering (e.g. $K_{RRCint}$ and $K_{RRCenc}$) from the $K_{eNB}$ received from the MME 112.

At 51042, assuming security context setup at the pico base station 5-2, 5-3 is successful, the pico base station 5-2, 5-3 confirms this to the macro base station 5-1 in an appropriate X2-AP message (e.g. an 'X2-AP CONTEXT SETUP RESPONSE' message).

The macro base station 5-1 then initiates, at S1044, an RRC (and user plane) security context setup at the mobile communication device 3 using RRC signalling (e.g. an 'RRC SECURITY MODE COMMAND' message) which includes information identifying the algorithms used for integrity protection and/or ciphering and an information indicating that the U-plane and C-plane are split (e.g. in the form of a dedicated information element (IE), a modified IE, or re-use of an existing IE).

The mobile communication device 3 responds, at S1046, by initialising the RRC security context for communication with the macro base station 5-1 by deriving the values of $K_{RRCint}$, $K_{RRCenc}$ from the previously calculated value of $K_{eNB}$ for use with control signalling from the macro base station 5-1. The mobile communication device 3 also initialises the U-plane security context for communication with the pico base station 5-2, 5-3 by deriving the value of $K_{UPenc}$ from $K_{eNB}$ for use with user plane signalling to/from the pico base station 5-2, 5-3.

Assuming the security context setup is successful the mobile communication device 3 confirms this, at 51032, by sending an appropriate response message to the macro base station 5-1 (e.g. an 'RRC SECURITY MODE COMPLETE' message) at S1050.

The macro base station 5-1 confirms, at 51052, successful security context setup to the MME 112 in an appropriate S1-AP message (e.g. an 'S1-AP INITIAL CONTEXT SETUP REQUEST' message).

Once the various security contexts (NAS and AS) have been initialised successfully on the various devices, the control and user signalling connections can be setup at S1054 and the mobile communication device can commence communication in which control plane signalling (S1056) is provided by the macro base station 5-1 and U-plane signalling is provided via the pico base station 5-2, 5-3 (S1058).

Advantageously, therefore, this method provides another efficient way of providing appropriate communication security where different base stations are responsible for U-plane signalling and C-plane signalling respectively. The user device is able to maintain an appropriate security context for both the U-Plane and the C-plane thereby allowing it to encipher/decipher user data and control data correctly and to keep track of the security parameters (keys) used in the different base stations.

Informing the mobile communication device of the C-plane/U-plane split in this way provides an efficient way of ensuring that the mobile communication device has the information required to establish that derivation of the user plane security parameter ($K_{UPenc}$) is required for communication with the pico cell.

This approach has the benefit over the first method described herein that it avoids S1 signalling duplication and hence reduces S1 signalling overhead. The first method has the benefit, however, that it avoids the need for the modification of base station to base station signalling (over the X2 or possibly a new interface) and the associated increase X2-AP the complexity.

Base Station Based $K_{UPenc}$ Provision

Figure 11:
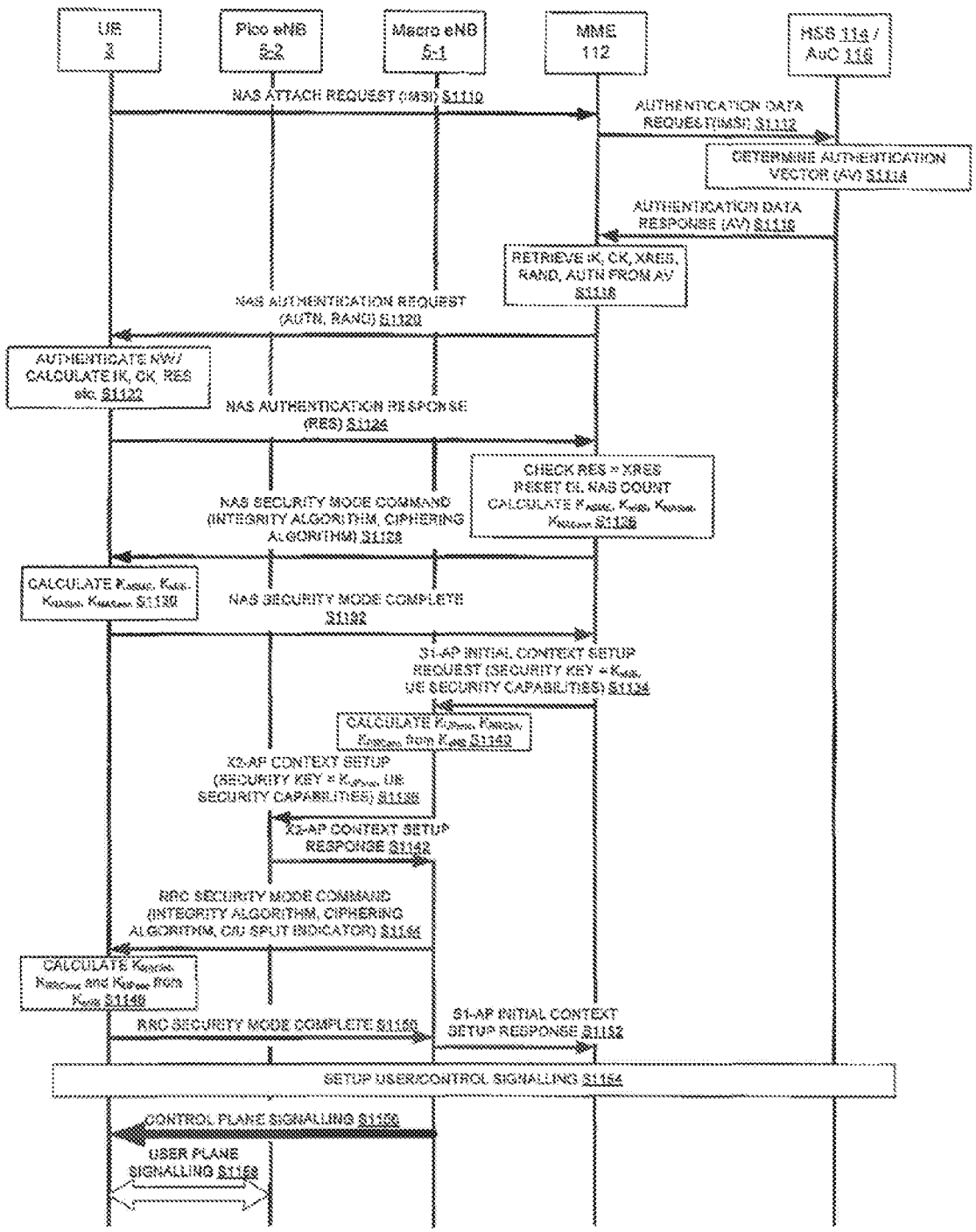
FIG. 11 shows a simplified timing diagram illustrating operation of the telecommunication system of FIG. 1 in the performance of a third security procedure.

FIG. 11 shows a simplified timing diagram illustrating operation of the telecommunication system of FIG. 1 in the performance of a third security procedure in which appropriate security parameters, and in particular appropriate values of $K_{UPenc}$, are generated at the macro base station 5-1 in response to signalling from the MME 112, and are forwarded to the pico base station 5-2, 5-3 over the X2 interface.

At the start of the security procedure illustrated in FIG. 11, a mobile communication device 3 wishing to initiate communication in the pico cell 5-1, 5-2 sends a non access stratum (NAS) message requesting attachment (e.g. an 'NAS ATTACH REQUEST' message) to the MME 112 (transparently via the macro base stations 5-1) at S1110 including information identifying the SIM card 530 of the mobile communication device 3 (e.g. the 'international mobile subscriber identity (IMSI)').

The MME 112 responds to this request, at S1112, by sending a message requesting authentication and including information identifying the SIM card 530 to the HSS 114 (e.g. and 'AUTHENTICATION DATA REQUEST' message). The AuC function 116 of the HSS 114 derives RAND, XRES, CK, IK, AUTN and combines them to form an authentication vector for the SIM card 530 (AV=RAND||XRES||CK||IK||AUTN) at S1114 and sends the generated AV to the MME 112 at 51116 (e.g. in a 'AUTHENTICATION DATA RESPONSE' message).

The MME 112 retrieves IK, CK, XRES, RAND and AUTN from the AV at 51118 and sends the AUTN and RAND parameters to the mobile communication device 3 using NAS signalling at 51120 (e.g. in an 'NAS AUTHENTICATION REQUEST' message).

The mobile communication device 3 responds, at S1122, by authenticating the network using the received AUTN, and by deriving appropriate security related parameters (IK, CK, RES etc.) using the stored permanent security key 'K' and the received AUTN and RAND parameters (and any other parameters where necessary—e.g. AMF for the determination of XMAC). Assuming the authentication is successful, the mobile communication device 3 sends the calculated value of RES to the MME 112 at 51124 (e.g. in an 'NAS AUTHENTICATION RESPONSE' message).

The MME 112 checks the received RES value against XRES at 51126, resets the downlink NAS count, and derives values of $K_{ASME}$, $K_{eNB}$, $K_{NASint}$ and $K_{NASenc}$. The MME 112 then initiates NAS signalling security between the MME 112 and the mobile communication device 3, at S1128, by sending an NAS SECURITY MODE COMMAND message informing the mobile communication device 3 of the respective algorithms to use for integrity protection and (de) ciphering.

The mobile communication device 3 responds, at S1130, by deriving values of $K_{ASME}$, $K_{eNB}$, $K_{NASint}$ and $K_{NASenc}$ and then, at S1132, by sending a response message informing the MME 112 that NAS signalling security initialisation is complete.

The method then proceeds by initiating security context setup at the macro base station 5-1, by sending an S1 application (S1-AP) message (e.g. an 'S1-AP INITIAL CONTEXT SETUP REQUEST' message) to the macro base station 5-1 at S1134. The S1-AP message includes the derived value of $K_{eNB}$ and details of the security capabilities for the mobile communication device 3.

The macro base station 5-1 derives, at S1140, the security parameter(s) required for C-plane protection (e.g. $K_{RRCint}$ and $K_{RRCenc}$) and for U-plane protection (e.g. $K_{UPenc}$) from the $K_{eNB}$ received from the MME 112.

The macro base station 5-1 initiates security context setup at the pico base station 5-2, 5-3, by sending an X2 application (X2-AP) message (e.g. a new 'X2-AP CONTEXT SETUP' message) to the pico base station 5-2, 5-3 at 51136. The X2-AP message includes the derived value of $K_{UPenc}$ and details of the security capabilities for the mobile communication device 3.

The pico base station 5-2, 5-3, on receipt of $K_{UPenc}$ from the macro base station 5-1, and assuming security context setup at the pico base station 5-2, 5-3 is successful, confirms this to the macro base station 5-1 in an appropriate X2-AP message (e.g. an 'X2-AP CONTEXT SETUP RESPONSE' message) at S1142.

The macro base station 5-1 then initiates, at S1144, an RRC (and user plane) security context setup at the mobile communication device 3 using RRC signalling (e.g. an 'RRC SECURITY MODE COMMAND' message) which includes information identifying the algorithms used for integrity protection and/or ciphering and an information indicating that the U-plane and C-plane are split (e.g. in the form of a dedicated information element (IE), a modified IE, or re-use of an existing IE).

The mobile communication device 3 responds, at S1146, by initialising the RRC security context for communication with the macro base station 5-1 by deriving the values of $K_{RRCint}$, $K_{RRCenc}$ from the previously calculated value of $K_{eNB}$ for use with control signalling from the macro base station 5-1. The mobile communication device 3 also initialises the U-plane security context for communication with the pico base station 5-2, 5-3 by deriving the value of $K_{UPenc}$ from $K_{eNB}$ for use with user plane signalling to/from the pico base station 5-2, 5-3.

Assuming the security context setup is successful the mobile communication device 3 confirms this, at S1132, by sending an appropriate response message to the macro base station 5-1 (e.g. an 'RRC SECURITY MODE COMPLETE' message) at S1150.

The macro base station 5-1 confirms, at S1152, successful security context setup to the MME 112 in an appropriate S1-AP message (e.g. an 'S1-AP INITIAL CONTEXT SETUP REQUEST' message).

Once the various security contexts (NAS and AS) have been initialised successfully on the various devices, the control and user signalling connections can be setup at S1154 and the mobile communication device can commence communication in which control plane signalling (S1156) is provided by the macro base station 5-1 and U-plane signalling is provided via the pico base station 5-2, 5-3 (S1158).

Advantageously, therefore, this method provides another efficient way of providing appropriate communication security where different base stations are responsible for U-plane signalling and C-plane signalling respectively. The user device is able to maintain an appropriate security context for both the U-Plane and the C-plane thereby allowing it to encipher/decipher user data and control data correctly and to keep track of the security parameters (keys) used in the different base stations.

Informing the mobile communication device of the C-plane/U-plane split in this way provides an efficient way of ensuring that the mobile communication device has the information required to establish that derivation of the user plane security parameter ($K_{UPenc}$) is required for communication with the pico cell.

This approach has the benefit over the other methods described herein that the pico base station does not have to derive Kuper, itself thereby simplifying it further which is in keeping with the general desire to keep its complexity to a minimum. However, other methods described herein have the security benefit, over this method, that the value of $K_{UPenc}$ (which is also used by the mobile telephone 3) is not transmitted and therefore cannot be as easily compromised (e.g. by 'eavesdropping'), which can lead to user data security being compromised. If $K_{eNB}$, which is transferred in other methods, is compromised it is not a trivial matter to derive $K_{UPenc}$ from it because of the need to know other security keys to do so.

Base Station Based $K_{eNB}$* Provision

Figure 12:
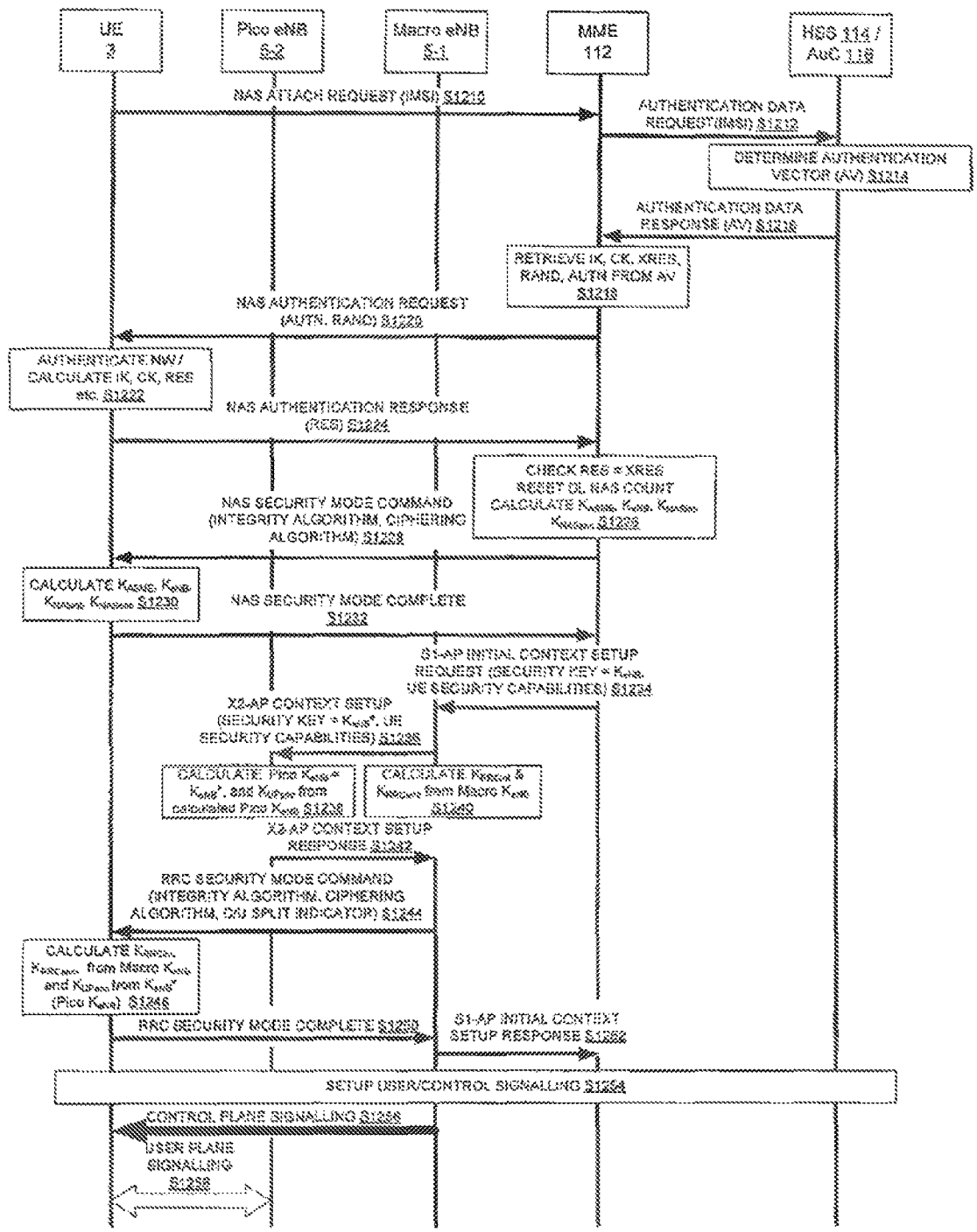
FIG. 12 shows a simplified timing diagram illustrating operation of the telecommunication system of FIG. 1 in the performance of a fourth security procedure.

It will be appreciated that, currently, the transfer of $K_{eNB}$ and $K_{UPenc}$ between base stations is not supported in any circumstances. FIG. 12 shows a simplified timing diagram illustrating operation of the telecommunication system of FIG. 1 in the performance of a fourth security procedure in which, rather than transfer a parameter for which between base stations transfer is not currently supported, a security parameter ($K_{eNB*}$) is transferred for which transfer between base stations is currently supported, albeit in limited circumstances. Specifically, currently the transfer of $K_{eNB}$* between base stations is supported during handover. Accordingly, this fourth security procedure extends the circumstances in which $K_{eNB}$* is supported to security context setup in the case of a U-plane/C-plane split.

Specifically, $K_{eNB}$* is generated at the macro base station 5-1 (as it would be during a handover) in response to signalling from the MME 112, and is forwarded to the pico base station 5-2, 5-3 over the X2 interface.

At the start of the security procedure illustrated in FIG. 12, a mobile communication device 3 wishing to initiate communication in the pico cell 5-1, 5-2 sends a non access stratum (NAS) message requesting attachment (e.g. an 'NAS ATTACH REQUEST' message) to the MME 112 (transparently via the macro base stations 5-1) at S1210 including information identifying the SIM card 530 of the mobile communication device 3 (e.g. the 'international mobile subscriber identity (IMSI)').

The MME 112 responds to this request, at S1212, by sending a message requesting authentication and including information identifying the SIM card 530 to the HSS 114 (e.g. and 'AUTHENTICATION DATA REQUEST' message). The AuC function 116 of the HSS 114 derives RAND, XRES, CK, IK, AUTN and combines them to form an authentication vector for the SIM card 530 (AV=RAND∥XRES∥CK∥IK∥AUTN) at S1214 and sends the generated AV to the MME 112 at S1216 (e.g. in a 'AUTHENTICATION DATA RESPONSE' message).

The MME 112 retrieves IK, CK, XRES, RAND and AUTN from the AV at S1218 and sends the AUTN and RAND parameters to the mobile communication device 3 using NAS signalling at S1220 (e.g. in an 'NAS AUTHENTICATION REQUEST' message).

The mobile communication device 3 responds, at S1222, by authenticating the network using the received AUTN, and by deriving appropriate security related parameters (IK, CK, RES etc.) using the stored permanent security key 'K' and the received AUTN and RAND parameters (and any other parameters where necessary—e.g. AMF for the determination of XMAC).

Assuming the authentication is successful, the mobile communication device 3 sends the calculated value of RES to the MME 112 at S1224 (e.g. in an 'NAS AUTHENTICATION RESPONSE' message).

The MME 112 checks the received RES value against XRES at S1226, resets the downlink NAS count, and derives values of $K_{ASME}$, $K_{eNB}$, $K_{NASint}$ and $K_{NASenc}$. The MME 112 then initiates NAS signalling security between the MME 112 and the mobile communication device 3, at S1228, by sending an NAS SECURITY MODE COMMAND message informing the mobile communication device 3 of the respective algorithms to use for integrity protection and (de) ciphering.

The mobile communication device 3 responds, at S1230, by deriving values of $K_{ASME}$, $K_{eNB}$, $K_{NASint}$ and $K_{NASenc}$ and then, at S1232, by sending a response message informing the MME 112 that NAS signalling security initialisation is complete.

The method then proceeds by initiating security context setup at the macro base station 5-1, by sending an S1 application (S1-AP) message (e.g. an 'S1-AP INITIAL CONTEXT SETUP REQUEST' message) to the macro base station 5-1 at S1234. The S1-AP message includes the derived value of $K_{eNB}$ and details of the security capabilities for the mobile communication device 3.

The macro base station 5-1 initiates security context setup at the pico base station 5-2, 5-3, by sending an X2 application (X2-AP) message (e.g. a new 'X2-AP CONTEXT SETUP' message) to the pico base station 5-2, 5-3 at S1236. The X2-AP message includes a value of $K_{eNB}$*, derived from the value of $K_{eNB}$ from the MME 112 (and possibly a value of NH), and details of the security capabilities for the mobile communication device 3. The value of $K_{eNB}$* is effectively derived in the same way as for handover although it may be given another name (e.g. $K_{eNB}$**) to allow it to be distinguished from the handover case.

The pico base station 5-2, 5-3, on receipt of $K_{eNB}$* from the macro base station 5-1, derives, at S1238, the security parameter(s) required for U-plane enciphering/deciphering. Specifically, the pico base station 5-2, 5-3 derives a value of $K_{eNB}$ (effectively a 'pico' $K_{eNB}$) from the received $K_{eNB}$* and a value of $K_{UPenc}$ from the derived pico $K_{eNB}$. Similarly, the macro base station 5-1 derives, at S1240, the security parameter(s) required for C-plane enciphering/deciphering (e.g. $K_{RRCint}$ and $K_{RRCenc}$) from the $K_{eNB}$ received from the MME 112.

Assuming that security context setup is successful, the pico base station 5-2, 5-3 confirms this to the macro base station 5-1 in an appropriate X2-AP message (e.g. an 'X2-AP CONTEXT SETUP RESPONSE' message) at S1242.

The macro base station 5-1 then initiates, at S1244, an RRC (and user plane) security context setup at the mobile communication device 3 using RRC signalling (e.g. an 'RRC SECURITY MODE COMMAND' message) which includes information identifying the algorithms used for integrity protection and/or ciphering and an information indicating that the U-plane and C-plane are split (e.g. in the form of a dedicated information element (IE), a modified IE, or re-use of an existing IE).

The mobile communication device 3 responds, at S1246, by initialising the RRC security context for communication with the macro base station 5-1 by deriving the values of $K_{RRCint}$, $K_{RRCenc}$ from the previously calculated value of ('macro') $K_{eNB}$ for use with control signalling from the macro base station 5-1. The mobile communication device 3 also initialises the U-plane security context for communication with the pico base station 5-2, 5-3 by deriving the value of $K_{eNB}^*$ and hence the 'pico' $K_{eNB}$ from which the correct $K_{UPenc}$ can be found for use with user plane signalling to/from the pico base station 5-2, 5-3.

Assuming the security context setup is successful the mobile communication device 3 confirms this, at S1232, by sending an appropriate response message to the macro base station 5-1 (e.g. an 'RRC SECURITY MODE COMPLETE' message) at S1250.

The macro base station 5-1 confirms, at S1252, successful security context setup to the MME 112 in an appropriate S1-AP message (e.g. an 'S1-AP INITIAL CONTEXT SETUP REQUEST' message).

Once the various security contexts (NAS and AS) have been initialised successfully on the various devices, the control and user signalling connections can be setup at S1254 and the mobile communication device can commence communication in which control plane signalling (S1256) is provided by the macro base station 5-1 and U-plane signalling is provided via the pico base station 5-2, 5-3 (S1258).

Advantageously, therefore, this method provides another efficient way of providing appropriate communication security where different base stations are responsible for U-plane signalling and C-plane signalling respectively. The user device is able to maintain an appropriate security context for both the U-Plane and the C-plane thereby allowing it to encipher/decipher user data and control data correctly and to keep track of the security parameters (keys) used in the different base stations.

Informing the mobile communication device of the C-plane/U-plane split in this way provides an efficient way of ensuring that the mobile communication device has the information required to establish that derivation of the user plane security parameter ($K_{UPenc}$) is required for communication with the pico cell.

This approach has the benefit over the other methods described herein that it does not require security parameters to be transferred between base stations for which such transfer is not currently supported. However, other methods described herein have the benefit added complexity in order to properly derive $K_{eNB}^*$ in non-handover scenarios.
Separate Authentication and Key Agreement (AKA) Procedures FIG. 13 shows a simplified diagram illustrating operation of the telecommunication system of FIG. 1 in the performance of a further security procedure in which, rather than run a single AKA procedure for the macro base station 5-1 during which appropriate security parameters are passed to and/or derived at the pico base station 5-2, 5-3 (e.g. as illustrated in each of FIGS. 9 to 11), separate AKA procedures are run for the macro base station 5-1 and pico base station 5-2, 5-3.

Figure 13:
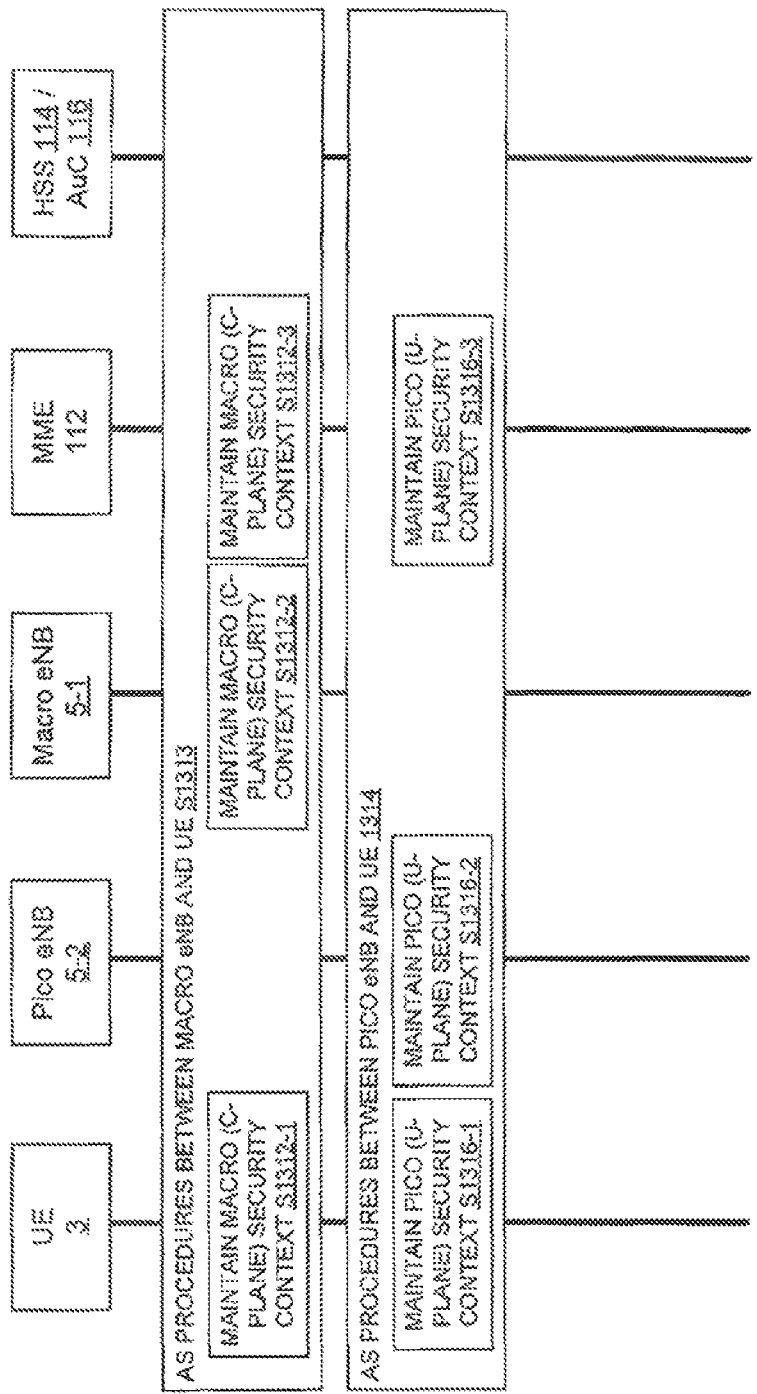
FIG. 13 shows a simplified timing diagram illustrating operation of the telecommunication system of FIG. 1 in the performance of an authentication and key agreement procedure.

As seen in FIG. 13, the procedure involves, at S1313, AS security procedures being run for communications between the macro base station 5-1 and the mobile communication device 3. During this procedure the mobile communication device 3, the macro base station 5-1 and the MME 112, each generates and maintains its own respective security context S1312-1, S1312-2, S1312-3 for the C-plane signalling between the macro base station 5-1 and the mobile communication device 3. The generation of each security context includes the derivation of appropriate macro/C-plane specific security keys (e.g. $K_{RRCint}$, $K_{RRCenc}$ etc. as described previously).

The procedure also involves, at S1314, AS security procedures being run for communications between the pico base station 5-2, 5-3 and the mobile communication device 3. During this procedure the mobile communication device 3, the pico base station 5-2, 5-3 and the MME 112, each generates and maintains its own respective security context S1316-1, S1316-2, S1316-3 for the U-plane signalling between the pico base station 5-2, 5-3 and the mobile communication device 3. The generation of each security context includes the derivation of appropriate pico/U-plane specific security keys (e.g. $K_{UPenc}$ etc. as described previously).

It will be appreciated that the procedures of S1313 and S1314 may be run sequentially in any appropriate order or in parallel.

It can be seen, therefore, that as a result of the procedure in FIG. 13, the MME 112 and the mobile communication device 3 each maintain two active security contexts. In order to support the presence of two active security contexts, handover signalling (for handover from macro+pico to another macro+pico) in this example is modified to allow the exchange of two security contexts. For example, the signalling might be modified to allow two $K_{eNB}^*$ (based on each $K_{eNB}$) to be generated and transferred, different security algorithm (if different algorithms are used) to be notified, and the signalling of other general information relating to the two different security contexts.

Further, in order to support the dual AKA procedure of FIG. 13, RRC and NAS messages are modified appropriately. For example, the RRC SECURITY MODE COMMAND is modified to include information identifying the security algorithm for each AKA procedure and the NAS security messages are modified to include duplicates of the security parameters where necessary.

The mobile communication device 3 maintains two ciphering instances (e.g. in the PDCP layer) each with its own set of security keys—one for control plane ciphering and one for user plane ciphering.

It will be appreciated that, a similar procedure could be applied, if necessary, for generating separate NAS contexts for the pico and macro base stations AKA procedure being run. The procedure would be similar to that described with reference to FIGS. 9 to 12 but, during this procedure, the mobile communication device 3 and the MME 112 would each generate and maintain an NAS security context for the macro base station 5-1 and a separate NAS security context for the pico base station 5-2, 5-3. The generation and transmission of the NAS security contexts might include the derivation and transmission of duplicate security parameters (one copy for each context) where appropriate.

Key Change on the Fly Procedures

Regardless of which of the above procedures is implemented, in order to avoid potential security issues associated with PDCP COUNT rollover, the pico base station 5-2, 5-3, is operable to inform the macro base station 5-1, when PDCP COUNT rollover has occurred, or is about to occur, using a new X2-AP message including an information element indicating the $K_{UPenc}$ requires changing (e.g. a '$K_{UPenc}$ key change' IE). In response to receiving this message the macro base station 5-1 initiates an inter-cell hand over which will, ultimately, result in communication continuing in the current pico/macro cell pair but using a different value of $K_{UPenc}$ for user plane ciphering.

Similarly, where other security parameters, such as $K_{eNB}$, are changed dynamically and provided by the MME 112 to the macro base station 5-1 (in accordance with current procedures) the macro base station 5-1 is configured to forward the new $K_{eNB}$ to the pico base station 5-2, 5-3 when the procedure shown in FIG. 10 is implemented. Where the procedure shown in FIG. 11 is implemented the macro base station 5-1 is configured to forward a new $K_{eNB}*$ to the pico base station 5-2, 5-3. Where the procedure shown in FIG. 12 is implemented the macro base station 5-1 is configured to forward a new $K_{UPenc}$ to the pico base station 5-2, 5-3. Where the procedure shown in FIG. 9 is implemented the MME 112 is configured to forward the new $K_{eNB}$ to the pico base station 5-2, 5-3 in a duplicate S1 message.

Modifications and Alternatives

A detailed embodiment and has been described above. As those skilled in the art will appreciate, a number of modifications and alternatives can be made to the above embodiment and variations whilst still benefiting from the inventions embodied therein.

In the above embodiments one macro cell 7 and two pico cells 10 are described; the pico cells are operated using component carriers having the same frequency band (F2) and the macro cell is operated using a component carrier having a different frequency band (F1) and. It will be appreciated that in a deployed system there may be any number of pico cells each of which may operate on a component carrier having a different respective frequency band and could potentially operate on a component carrier having the same frequency band as the macro cell.

In the above embodiments the macro and pico base stations may have the same security capabilities. If different security capabilities are supported, however, the mobile communication device is informed (e.g. in the 'RRC SECURITY MODE COMMAND' or other similar message) of the appropriate capabilities for each base station thereby allowing the mobile communication device using the correct algorithms.

In the above embodiments the ciphering key is transferred from the macro base station or derived by the pico base station based on security information received from either the MME or the macro base station. It will be appreciated that the other parameters required for U-plane ciphering/deciphering may be derived as follows: COUNT may be maintained by the pico base station at the PDCP level; BEARER identity may either be transferred from the macro base station or may be selected by the pico base station; and DIRECTION may be set either at the macro or the pico base station. Appropriate synchronisation may be provided between the macro and pico base stations to ensure, for example, that the correct bearer identity is known both at the macro and the pico base station. In the event that both base stations have the information and capability to decide a particular parameter (e.g. 'DIRECTION') only one will make the decision and this will be informed to the other base station.

The detailed description provided for the embodiments of FIGS. 9 to 12 relate to procedures for initial connection establishment. It will be appreciated that a similar approach may be used when a decision to split the U-plane and C-plane is taken at a later stage. For example, where the mobile communication device is engaged in a type of user plane communication that is provided by the macro cell (say voice over IP 'VoIP) and then starts a different form of user plane communication which is provided by the pico cell (say a web browsing session) a C-plane/U-plane split may need to be initiated. In this case an S1 UE CONTEXT MODIFICATION (with a corresponding response) may be used to provide the pico base with appropriate security information (analogous to the process of FIG. 9). Similarly, a new X2 message (with a corresponding response) may be provided (e.g. an X2-AP CONTEXT MODIFICATION message) (analogous to the processes of any of FIGS. 10 to 12). Moreover, the RRC signalling used to provide the mobile communication device with appropriate security information (where the security parameters have changed) and/or an indication that a split has occurred may be a message such as an RRC Roconfiguration message (with a corresponding response).

Whilst specific new X2-AP messages (X2-AP CONTEXT SETUP and 'X2-AP CONTEXT SETUP RESPONSE) has been described it will be appreciated that any suitable X2-AP message may be used including the re-use of an existing message with the addition of appropriate information elements.

Further although information such as $K_{eNB}$ is described as being exchanged over an X2 interface between the pico and macro base stations, it will be appreciated that the interface between the base stations may be a new dedicated interface (e.g. an 'X3' interface).

Although the RRC SECURITY MODE COMMAND message has been described as including information indicating that the U-plane and C-plane are split (e.g. in the form of a dedicated information element (IE), a modified IE, or re-use of an existing IE) an indication of the C-plane/U-plane split could (alternatively or additionally) be notified to the mobile communication device in an NAS message such as a NAS SECURITY MODE COMMAND message.

The information elements included in such a message will typically include, for example:

A Security Key IE for messages from the macro base station to the pico base station (which may be used in the procedures of FIGS. 10 to 13 or for key change on the fly procedures)

This may be KeNB or Next hop (NH)

In the case of the implementation of FIG. 10, for example, it may be the macro $K_{eNB}$ In the case of the implementation of FIG. 12 it may be be KeNB*

In the case of the dual AKAs of FIG. 13 it may be the Pico KeNB for the new AKA A UE Security Capabilities IE for messages from the macro base station to the pico base station (to indicate a change in security capabilities for example)

A KUPenc key change IE for messages from the pico base station to the macro base station (to indicate the need for an intra cell handover procedure on PDCP COUNT rollover)

Referring to the timing diagrams, it will be appreciated that in many cases the messaging may not need to follow the specific order shown but may follow any logical order.

Referring to FIG. 9, by way of example, it will be appreciated by those skilled in the art that although the S1-AP messages sent to the pico and macro base stations to initiate AS security context setup (S934, S936), and the resulting U-plane and C-plane key derivation (S938, S940), are shown occurring in a particular order (for the purposes of clear illustration) they may occur in any appropriate order or, where appropriate, in parallel. Specifically, for example, initiation of security context initialisation and key derivation at the pico base station 5-2, 5-3 (S934, S938) may occur wholly before, wholly after, or substantially in parallel with the corresponding initiation of security context initialisation and key derivation (S936, S940) at the macro base station 5-1. Similarly, the associated S1-AP response messages may be sent at any appropriate juncture after successful security context initialisation.

Further whilst, in FIG. 9, a duplicate of only one S1-AP message (S1-AP INITIAL CONTEXT SETUP) is shown as being sent to the pico base station to provide appropriate security parameters. It will be appreciated that a duplicate of any suitable S1-AP message carrying security parameters may be provided to the pico base station including, for example, a UE CONTEXT MODIFICATION message or the like.

In relation to the dual AKA procedure described with reference to FIG. 13, it will be appreciated that there may be a scenario in which the pico base station is not an E-UTRAN base station but instead connects to a non-EUTRAN or even a non-3GPP network. In this case the non-3GPP network may perform its own security procedure for the user plane whilst the macro base station still performs a 3GPP security procedure thereby resulting in a non-3GPP security context for the user plane and a 3GPP security context for the control plane.

It will be appreciated that although the communication system 1 is described in terms of base stations 5 operating as macro or pico base stations, the same principles may be applied to base stations operating as femto base stations, relay nodes providing elements of base station functionality, or other such communication nodes.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc. As those skilled in the art will appreciate, it is not essential that the above described relay system be used for mobile communications devices. The system can be used to extend the coverage of base stations in a network having one or more fixed computing devices as well as or instead of the mobile communicating devices.

In the embodiments described above, the base stations 5 and mobile communication devices 3 each include transceiver circuitry. Typically, this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from United Kingdom Patent Application No. 1300884.2, filed on Jan. 17, 2013, the disclosure of which is incorporated herein in its entirety by reference.

The invention claimed is:

1. A user equipment, UE, configured for simultaneous connection to a master base station and to a secondary base station, the UE comprising:
a controller; and
a transceiver;
wherein the controller is configured to:
derive a security key of the master base station;
derive, using the derived security key of the master base station, a security key of the secondary base station;
derive, using the security key of the secondary base station, a user plane security key for use in protection of user plane traffic between the UE and the secondary base station;
control the transceiver to receive a Radio Resource Control, RRC, message from the master base station;
derive, using the derived security key of the master base station, an updated security key of the secondary base station after receiving the RRC message; and
derive, using the updated security key of the secondary base station, an updated user plane security key for use in protection of user plane traffic between the UE and the secondary base station.

2. The UE according to claim 1, wherein said user plane security key comprises $K_{UPenc}$.

3. A method performed by a user equipment, UE, configured for simultaneous connection to a master base station and to a secondary base station, the method comprising:
deriving a security key of the master base station;
deriving, using the derived security key of the master base station, a security key of the secondary base station;
deriving, using the security key of the secondary base station, a user plane security key for use in protection of user plane traffic between the UE and the secondary base station;
receiving a Radio Resource Control, RRC, message from the master base station;
deriving, using the derived security key of the master base station, an updated security key of the secondary base station after receiving the RRC message; and
deriving, using the updated security key of the secondary base station, an updated user plane security key for use in protection of user plane traffic between the UE and the secondary base station.

4. The method according to claim 3, wherein said user plane security key comprises $K_{UPenc}$.

* * * * *